(12) United States Patent
Sakamoto

(10) Patent No.: US 11,250,388 B2
(45) Date of Patent: Feb. 15, 2022

(54) INFORMATION PROCESSING SYSTEM, INFORMATION TERMINAL, AND DISPLAY APPARATUS

(71) Applicant: SHARP KABUSHIKI KAISHA, Osaka (JP)

(72) Inventor: Kiho Sakamoto, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 33 days.

(21) Appl. No.: 16/747,305

(22) Filed: Jan. 20, 2020

(65) Prior Publication Data

US 2020/0258053 A1 Aug. 13, 2020

(30) Foreign Application Priority Data

Feb. 7, 2019 (JP) .............................. JP2019-020739

(51) Int. Cl.
| | |
|---|---|
| G06F 15/16 | (2006.01) |
| G06Q 10/10 | (2012.01) |
| G06F 16/22 | (2019.01) |
| H04L 29/06 | (2006.01) |

(52) U.S. Cl.
CPC ..... *G06Q 10/1095* (2013.01); *G06F 16/2282* (2019.01); *H04L 65/1069* (2013.01); *H04L 67/42* (2013.01)

(58) Field of Classification Search
CPC . H04L 65/1069; H04L 67/42; H04L 65/1073; H04W 76/11; H04M 3/56; G06Q 10/1095; G06F 16/2282

USPC ................................ 709/220; 705/7.27, 7.19
See application file for complete search history.

(56) References Cited

U.S. PATENT DOCUMENTS

| | | | | |
|---|---|---|---|---|
| 7,331,647 | B2 * | 2/2008 | Nakanishi | B41J 3/60 347/104 |
| 8,359,206 | B2 * | 1/2013 | Whalin | G06Q 10/06 705/1.1 |
| 8,407,078 | B1 * | 3/2013 | Caputo | G06Q 10/06 705/7.27 |
| 9,117,220 | B2 * | 8/2015 | Whalin | G06Q 30/0252 |
| 9,185,524 | B2 * | 11/2015 | Chambers | H04W 4/025 |
| 9,721,451 | B1 * | 8/2017 | Knas | G01C 21/206 |
| 9,947,053 | B2 * | 4/2018 | Heiferman | G06Q 50/01 |
| 10,191,699 | B2 * | 1/2019 | Yamaguchi | G06F 3/1222 |
| 10,298,410 | B2 * | 5/2019 | Whalin | H04W 4/21 |
| 2008/0181648 | A1 * | 7/2008 | Makishima | G03G 15/5083 399/75 |

(Continued)

FOREIGN PATENT DOCUMENTS

JP 2004-173198 A 6/2004

*Primary Examiner* — Quang N Nguyen
(74) *Attorney, Agent, or Firm* — ScienBiziP, P.C.

(57) ABSTRACT

An information processing system includes a server, an information terminal 4, and a sharing device. If the information terminal determines that a start meeting exists and detects the sharing device, the information terminal transmits predetermined information including identification information of the sharing device detected to the server. Based on the predetermined information and a management table, the server determines whether or not to cause the sharing device to execute a connection process. If the sharing device executes the connection process, the information terminal is wirelessly connected to the sharing device.

13 Claims, 16 Drawing Sheets

(56) References Cited

U.S. PATENT DOCUMENTS

| | | | |
|---|---|---|---|
| 2011/0296213 A1* | 12/2011 | Ferlitsch | G06Q 50/06 |
| | | | 713/320 |
| 2012/0254411 A1* | 10/2012 | Ito | H04L 67/10 |
| | | | 709/224 |
| 2018/0032963 A1* | 2/2018 | Griffin | H04W 68/00 |
| 2018/0195312 A1* | 7/2018 | Chen | E05C 1/12 |
| 2018/0204147 A1* | 7/2018 | Koitz | H04L 67/306 |
| 2020/0174874 A1* | 6/2020 | Yamada | G06F 11/0778 |
| 2020/0244592 A1* | 7/2020 | Fujimura | H04L 47/828 |
| 2020/0252518 A1* | 8/2020 | Takano | G06F 3/0481 |

\* cited by examiner

FIG. 7

| | 61 | 62 | 63 | 64 | 65 | 66 |
|---|---|---|---|---|---|---|
| | MEETING NAME | DATE AND TIME | LOCATION | IP ADDRESS | SSID | PARTICIPANT ID |
| 60, 6a | ZZZ | 11:00–12:00 | MEETING ROOM A | α | room A | PPP / QQQ |
| 60, 6b | YYY | 13:00–14:00 | MEETING ROOM A | α | room A | RRR / QQQ |
| 60, 6c | SSS | 14:00–15:00 | MEETING ROOM C | γ | room C | QQQ / RRR |
| 60, 6d | AAA | 15:00–16:00 | MEETING ROOM A | α | room A | PPP / QQQ |
| 60, 6e | XXX | 16:00–17:00 | MEETING ROOM B | β | room B | QQQ / PPP |

FIG. 9

| MEETING NAME | DATE AND TIME | LOCATION |
|---|---|---|
| ZZZ | 11:00~12:00 | MEETING ROOM A |
| YYY | 13:00~14:00 | MEETING ROOM A |
| SSS | 14:00~15:00 | MEETING ROOM C | ns
INFORMATION PROCESSING SYSTEM, INFORMATION TERMINAL, AND DISPLAY APPARATUS

INCORPORATION BY REFERENCE

Based on 35 U. S. C. 119, this application claims priority based on Japanese Patent Application Publication No. 2019-20739 filed on Feb. 7, 2019, the entire contents of which are incorporated herein by reference.

BACKGROUND OF THE INVENTION

Field of the Invention

The present disclosure relates to an information processing system, an information terminal, and a display apparatus.

Description of the Background Art

A meeting system is disclosed in Japanese Unexamined Patent Application No. 2004-173198 (hereinafter, Patent Document 1). In the meeting system disclosed in Patent Document 1, when reserving a meeting, a user registers a date and time when the meeting should be held, a participant, and other information in a schedule management server. The schedule management server generates a unique random number for the meeting reserved upon the registration. Then, the schedule management server stores the random number as a connection authentication code for local wireless communication. At the reserved meeting start time, the schedule management server sets the connection authentication code to an access point.

SUMMARY OF THE INVENTION

According to a first aspect of the present disclosure, an information processing system includes a server, an information terminal, and a sharing device. The server stores a management table for managing a meeting. The information terminal can communicate with the server. The sharing device can be connected to the information terminal. The management table includes information in which location information indicating a location where the meeting is held and identification information of the sharing device installed at the location where the meeting is held are associated. In a case where a start meeting exists, if the information terminal detects the sharing device, the information terminal transmits predetermined information including identification information of the sharing device detected to the server. The start meeting indicates a meeting scheduled to start within a predetermined time period from a current time. The server determines, based on the predetermined information and the management table, whether or not to cause the sharing device to execute a connection process. If the sharing device executes the connection process, the information terminal is wirelessly connected to the sharing device.

According to a second aspect of the present disclosure, an information terminal can communicate with a server. The server stores a management table for managing a meeting. The management table includes information in which location information indicating a location where the meeting is held and identification information of a sharing device installed at the location where the meeting is held are associated. In a case where a start meeting exists, if the information terminal detects the sharing device, the information terminal transmits predetermined information including identification information of the sharing device detected to the server. The start meeting indicates a meeting scheduled to start within a predetermined time period from a current time. The server determines, based on the predetermined information and the management table, whether or not to cause the sharing device to execute a connection process. If the sharing device executes the connection process, the information terminal is wirelessly connected to the sharing device.

According to a third aspect of the present disclosure, a server, an information terminal, and a sharing device are used in an information processing method. The server stores a management table for managing a meeting. The information terminal can communicate with the server. The sharing device can be connected to the information terminal. The information processing method includes transmitting, in a case where a start meeting exists, if the information terminal detects the sharing device, predetermined information including identification information of the sharing device detected to the server. The information processing method includes determining, by the server, whether or not to cause the sharing device to execute a connection process, based on the predetermined information and the management table. The management table includes information in which location information indicating a location where the meeting is held and identification information of the sharing device installed at the location where the meeting are associated. The start meeting indicates a meeting scheduled to start within a predetermined time period from a current time. If the sharing device executes the connection process, the information terminal is wirelessly connected to the sharing device.

According to a fourth aspect of the present disclosure, a display apparatus can communicate with a server. The display apparatus includes a display device and a sharing device. The display device displays an image. The sharing device can be connected to an information terminal. In a case where a start meeting exists, if the information terminal detects the sharing device, the information terminal transmits predetermined information including identification information of the sharing device detected to the server. The start meeting indicates a meeting scheduled to start within a predetermined time period from a current time. The server determines, based on the predetermined information and a management table, whether or not to cause the sharing device to execute a connection process. The management table includes information in which location information indicating a location where the meeting is held and identification information of the sharing device installed at the location where the meeting is held are associated. If the sharing device executes the connection process, the information terminal is communicably connected to the sharing device, and an image being displayed on the information terminal is displayed on the display device.

BRIEF DESCRIPTION OF THE DRAWINGS

FIG. 7 shows a management table;

FIG. 9 is a table showing schedule information;

DESCRIPTION OF THE PREFERRED EMBODIMENTS

Figure 1:
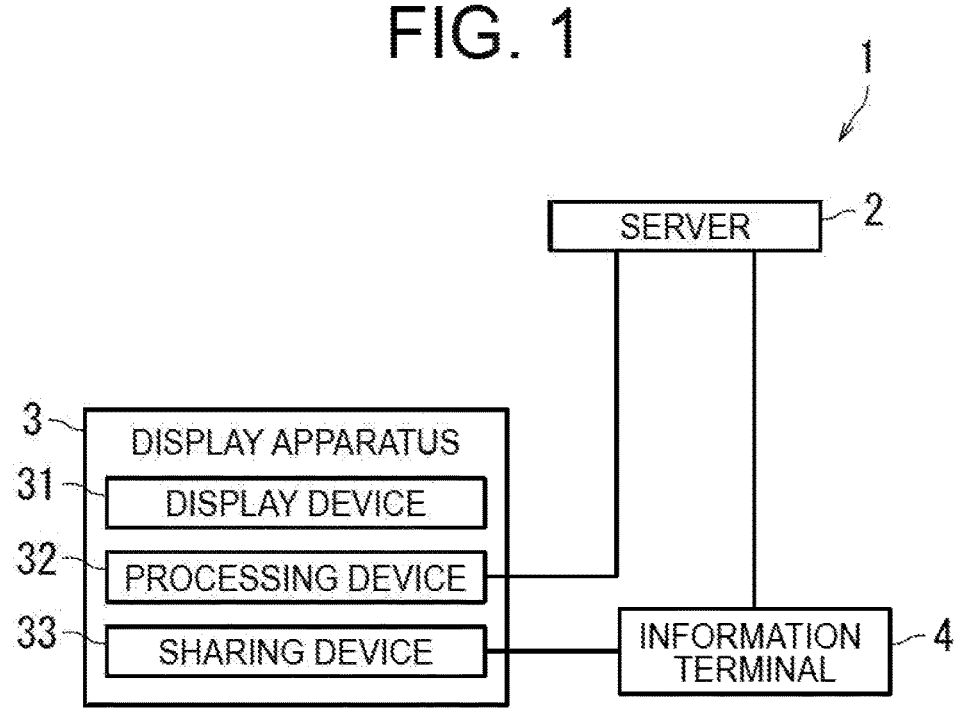
FIG. 1 is a block diagram illustrating a configuration of an information processing system according to a first embodiment of the present disclosure.

An embodiment of the present disclosure will be described with reference to the drawings. It is noted that, in the drawings, like reference numerals will be used for identical or corresponding parts to omit duplicate descriptions.

First Embodiment

With reference to FIG. 1, an information processing system 1 according to a first embodiment of the present disclosure will be described. FIG. 1 is a block diagram illustrating a configuration of the information processing system 1 according to the first embodiment of the present disclosure.

The information processing system 1 is used for a meeting, for example. As illustrated in FIG. 1, the information processing system 1 includes a server 2, a display apparatus 3, and an information terminal 4.

The server 2 manages the display apparatus 3 and the information terminal 4.

The display apparatus 3 can display an image indicated by image data received from the information terminal 4. The display apparatus 3 includes a display device 31, a processing device 32, and a sharing device 33. The display device 31 is a device that displays the image. The processing device 32 is connected to the sharing device 33, and can transmit, to the sharing device 33, a control command for controlling the sharing device 33.

The sharing device 33 is connected to the display device 31 and can control the display device 31. The sharing device 33 causes the display device 31 to display the image indicated by the image data received by the sharing device 33. As a result, the sharing device 33 controls the image displayed on the display device 31.

The sharing device 33 can be connected to the information terminal 4. The sharing device 33 is wirelessly connected to the information terminal 4 to wirelessly communicate with the information terminal 4.

The sharing device 33 is connected to the information terminal 4 to cause the display device 31 to display an image being displayed on the information terminal 4.

Figure 2:
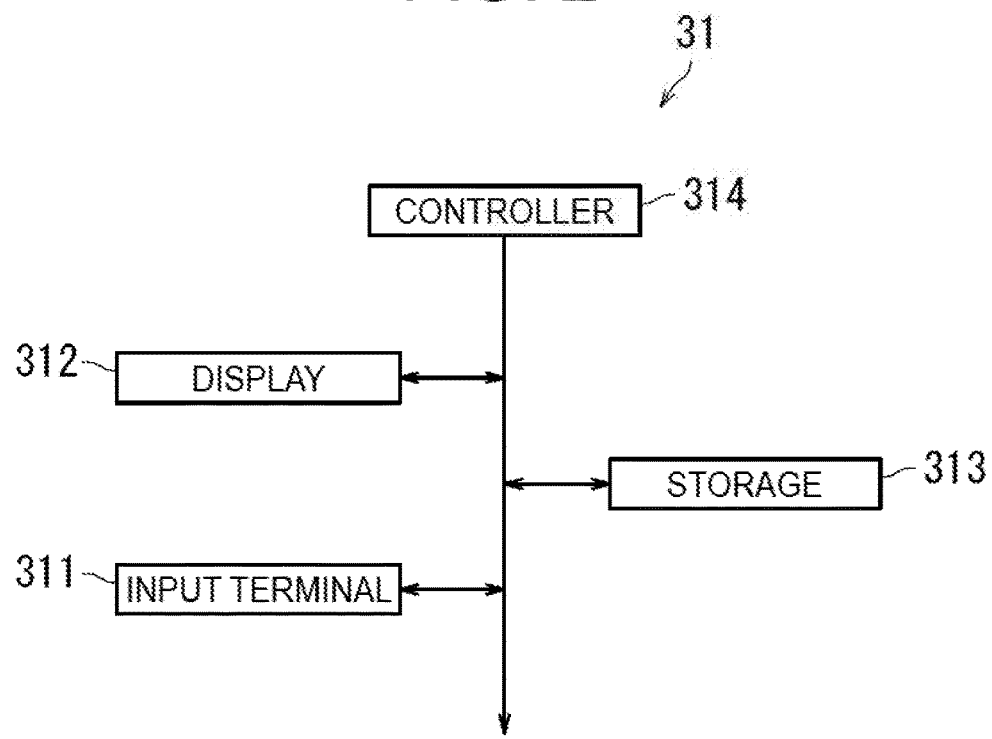
FIG. 2 is a block diagram illustrating a configuration of a display device.

Next, the display device 31 will be described with reference to FIG. 2. FIG. 2 is a block diagram illustrating a configuration of the display device 31.

As illustrated in FIG. 2, the display device 31 is, for example, a liquid crystal monitor. The display device 31 includes an input terminal 311, a display 312, a storage 313, and a controller 314.

The processing device 32 and the sharing device 33 are connected to the input terminal 311. The input terminal 311 is, for example, a D-SUB terminal, an HDMI (registered trademark) terminal, or a DisplayPort.

The display 312 displays various types of information. The display 312 is, for example, a liquid crystal display or an organic electroluminescence (EL) display.

The storage 313 includes, for example, a semiconductor memory such as a random access memory (RAM) and a read only memory (ROM). Further, the storage 313 may include a storage device such as a hard disk drive (HDD).

The controller 314 includes a processor such as a central processing unit (CPU), a micro processing unit (MPU), an application specific integrated circuit (ASIC), or a digital signal processor (DSP). The controller 314 controls the input terminal 311, the display 312, and the storage 313, based on a control program stored in the storage 313.

The display device 31 is an example of an output device of the present disclosure.

Figure 3:
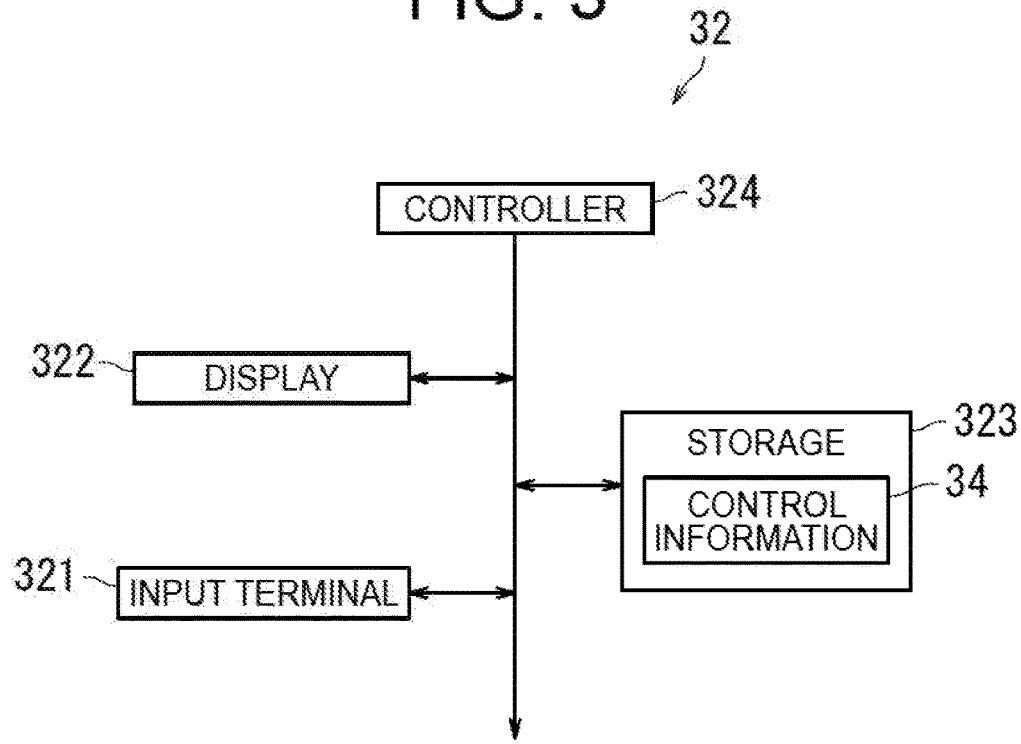
FIG. 3 is a block diagram illustrating a configuration of a processing device.

Next, the processing device 32 will be described with reference to FIG. 3. FIG. 3 is a block diagram illustrating a configuration of the processing device 32.

As illustrated in FIG. 3, the processing device 32 is, for example, a personal computer (PC). The processing device 32 controls the display device 31. The processing device 32 includes a communicator 321, an output terminal 322, a storage 323, and a controller 324.

The communicator 321 can communicate with the server 2 via a network. The communicator 321 is connected to the network by utilizing, for example, 3rd generation (3G), long term evolution (LTE), or a wireless access point.

The output terminal 322 is connected to the input terminal 311 of the display device 31. The output terminal 322 is, for example, a D-SUB terminal, an HDMI (registered trademark) terminal, or a DisplayPort.

The storage 323 includes a semiconductor memory such as a RAM and a ROM. Further, the storage 323 may include a storage device such as an HDD.

The controller 324 includes a processor such as a CPU, an MPU, an ASIC, or a DSP. The controller 324 controls the communicator 321, the output terminal 322, and the storage 323, based on a control program stored in the storage 323. Further, the controller 324 transmits a signal over a wireless or a wired connection to control the display device 31 and the sharing device 33.

Figure 4:
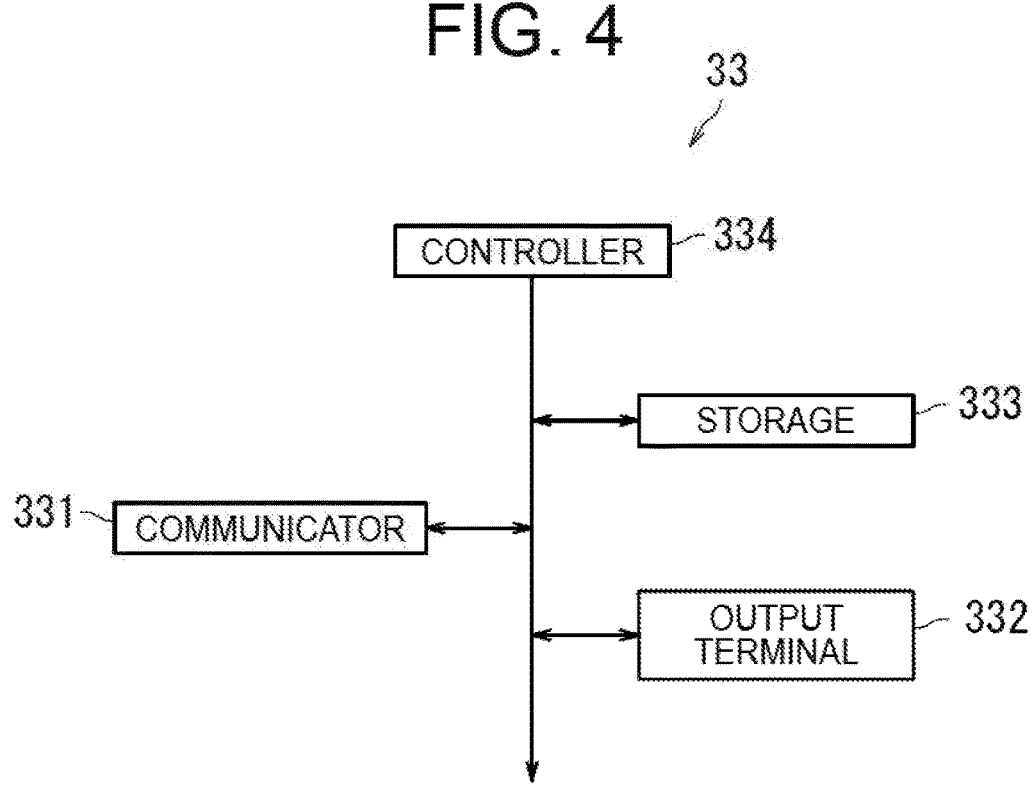
FIG. 4 is a block diagram illustrating a configuration of a sharing device.

Next, the sharing device 33 will be described with reference to FIG. 4. FIG. 4 is a block diagram illustrating a configuration of the sharing device 33.

As illustrated in FIG. 4, the sharing device 33 includes a communicator 331, an output terminal 332, a storage 333, and a controller 334.

The communicator 331 transmits and receives a radio signal. The output terminal 332 is connected to the input terminal 311 of the display device 31. The output terminal 332 is, for example, a D-SUB terminal, an HDMI (registered trademark) terminal, or a DisplayPort. The radio signal transmitted by the communicator 331 includes information indicating a service set identifier (SSID). The SSID is identification information of the sharing device 33.

The storage 333 includes a semiconductor memory such as a RAM and a ROM. Further, the storage 323 may include a storage device such as an HDD.

The controller 334 includes a processor such as a CPU, an MPU, an ASIC, or a DSP. The controller 334 controls the communicator 331, the output terminal 332, and the storage 333, based on a control program stored in the storage 333. The controller 334 encodes the radio signal transmitted from the communicator 331 and decodes of the radio signal received by the communicator 331.

In the first embodiment, the display device 31, the processing device 32, and the sharing device 33 are separate devices externally connected to each other. However, the present disclosure is not limited to this. The display device 31, the processing device 32, and the sharing device 33 may be integrated devices internally connected to each other.

Figure 5:
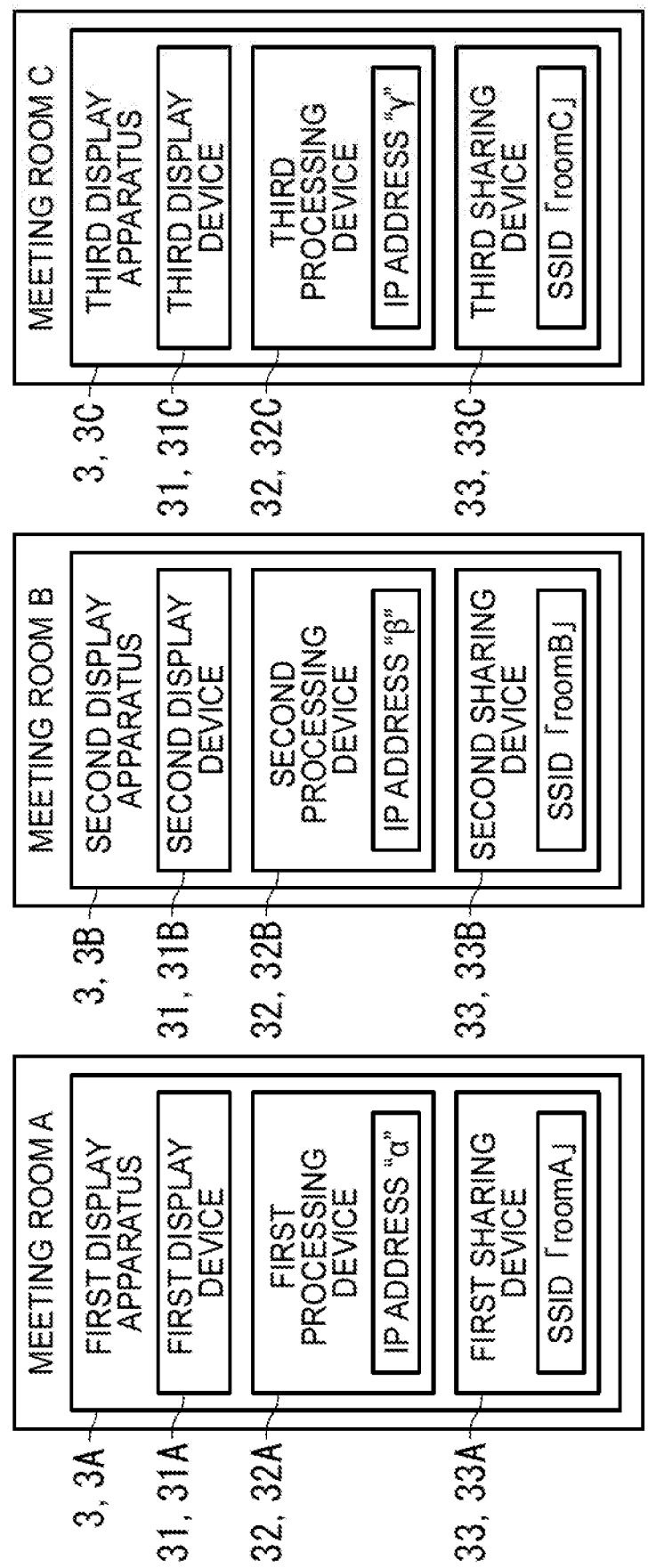
FIG. 5 is a schematic diagram illustrating an installation location of a display apparatus.

Next, an installation location of the display apparatus 3 will be described with reference to FIG. 5. FIG. 5 is a schematic diagram illustrating the installation location of the display apparatus 3.

As illustrated in FIG. 5, in the first embodiment, the display apparatus 3 is installed in each of a meeting room A, a meeting room B, and a meeting room C.

The display apparatus 3 installed in the meeting room A may be referred to as a first display apparatus 3A. The display apparatus 3 installed in the meeting room B may be referred to as a second display apparatus 3B. The display apparatus 3 installed in the meeting room C may be referred to as a third display apparatus 3C.

The display device 31 included in the first display apparatus 3A may be referred to as a first display device 31A, the processing device 32 included in the first display apparatus 3A may be referred to as a first processing device 32A, and the sharing device 33 included in the first display apparatus 3A may be referred to as a first sharing device 33A.

The display device 31 included in the second display apparatus 3B may be referred to as a second display device 31B, the processing device 32 included in the second display apparatus 3B may be referred to as a second processing device 32B, and the sharing device 33 included in the second display apparatus 3B may be referred to as a second sharing device 33B.

The display device 31 included in the third display apparatus 3C may be referred to as a third display device 31C, the processing device 32 included in the third display apparatus 3C may be referred to as a third processing device 32C, and the sharing device 33 included in the third display apparatus 3C may be referred to as a third sharing device 33C.

In the first embodiment, an IP address of the first processing device 32A is an IP address "α". An IP address of the second processing device 32B is an IP address "β". An IP address of the third processing device 32C is an IP address "γ".

In the first embodiment, an SSID of the first sharing device 33A is SSID "roomA". An SSID of the second sharing device 33B is SSID "roomB". An SSID of the third sharing device 33C is SSID "roomC".

Figure 6:
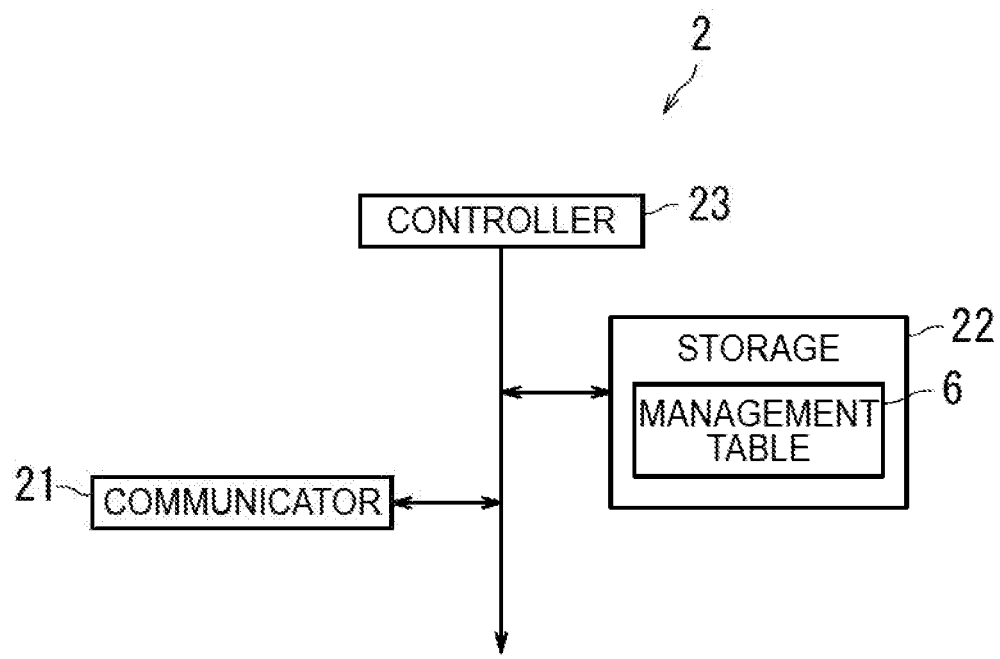
FIG. 6 is a block diagram illustrating a configuration of a server.

Next, the server 2 will be described with reference to FIG. 6. FIG. 6 is a block diagram illustrating a configuration of the server 2.

As illustrated in FIG. 6, the server 2 includes a communicator 21, a storage 22, and a controller 23.

The communicator 21 controls communication between each of the processing device 32 and the information terminal 4. The communicator 21 includes, for example, a local area network (LAN) board or a wireless LAN board.

The storage 22 includes a semiconductor memory such as a RAM and a ROM. Further, the storage 22 may include a storage device such as an HDD. The storage 22 stores a control program to be executed by the controller 23. The storage 22 stores a management table 6. The management table 6 will be described later.

The controller 23 includes a processor such as a CPU, an MPU, an ASIC, or a DSP. The controller 23 controls the communicator 21 and the storage 22 based on a control program stored in the storage 22.

Next, the management table 6 will be described with reference to FIG. 7. FIG. 7 shows the management table 6. The management table 6 is a table for managing a meeting by the server 2.

As illustrated in FIG. 7, the management table 6 includes a plurality of pieces of management information 60. In the first embodiment, the plurality of pieces of management information 60 include first management information 6a to fifth management information 6e.

The management information 60 is information in which meeting name information 61, date-and-time information 62, location information 63, internet protocol (IP) information 64, an SSID 65, and participant identification (ID) information 66 are associated.

The meeting name information 61 is information indicating a name of a meeting. The date-and-time information 62 is information indicating a date and time when the meeting is held. The location information 63 is information indicating a location where the meeting is held. The IP information 64 is information indicating an IP address of the processing device 32 installed at the location where the meeting is held. The SSID 65 is information indicating a network name of the sharing device 33 installed at the location where the meeting is held. The participant ID information 66 is information indicating an ID of a meeting participant.

The management table 6 is generated if a user uses an information transmission tool such as e-mail to transmit, to the server 2, information related to a meeting to be held.

Figure 8:
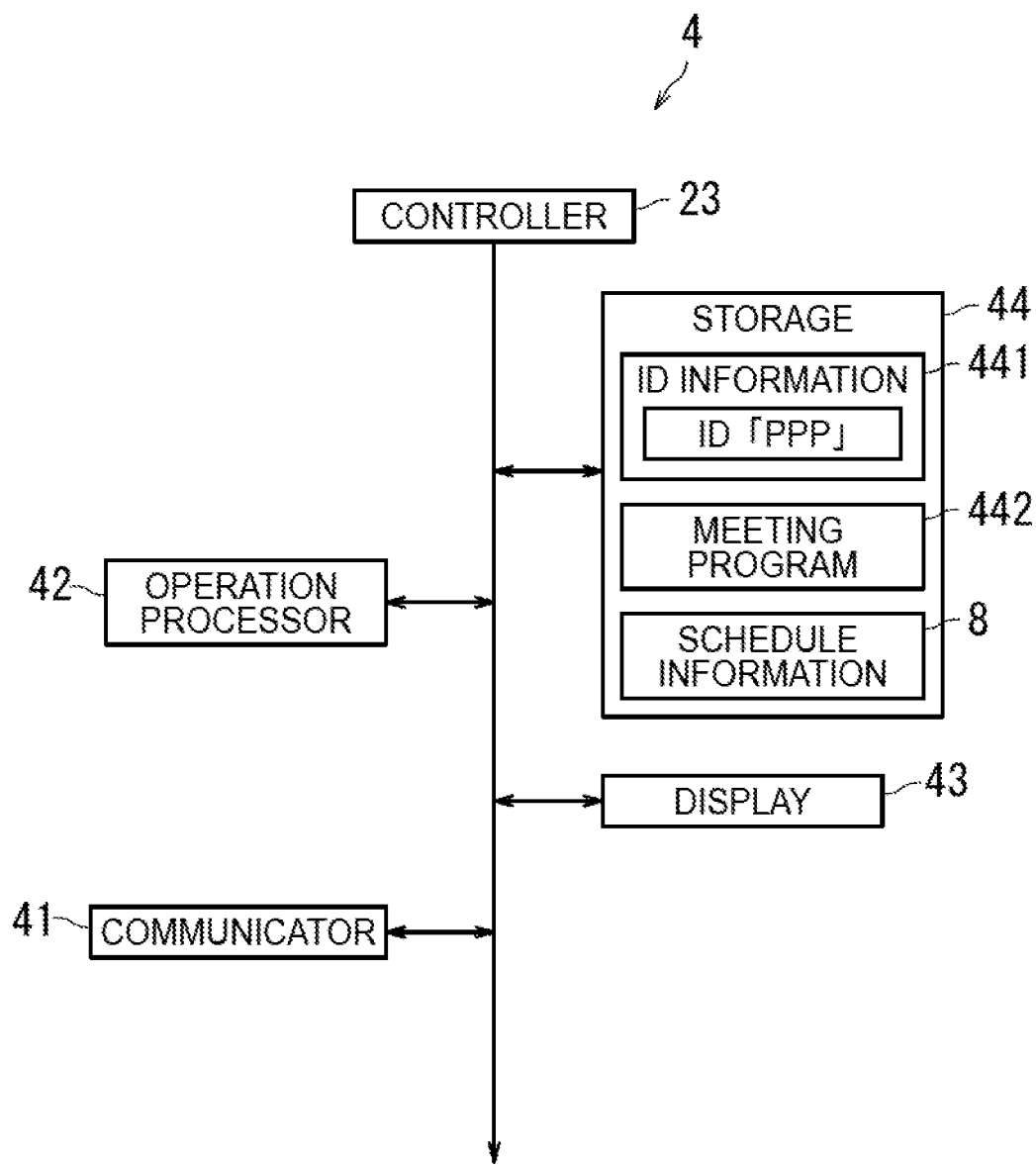
FIG. 8 is a block diagram illustrating a configuration of an information terminal.

Next, the information terminal 4 will be described with reference to FIG. 8. FIG. 8 is a block diagram illustrating a configuration of the information terminal 4.

As illustrated in FIG. 8, the information terminal 4 includes a communicator 41, an operation detector 42, a display 43, a storage 44, and a controller 45.

The communicator 41 can communicate with the server 2 via a network. The communicator 41 is connected to the network by utilizing, for example, 3rd generation (3G), long term evolution (LTE), or a wireless access point.

The communicator 41 can communicate with the sharing device 33 by using, for example, a communication standard such as WiFi (registered trademark) or Bluetooth (registered trademark).

The communicator 41 detects the sharing device 33 by receiving a radio signal transmitted from the sharing device 33. The controller 45 extracts the SSID of the sharing device 33 from the radio signal received by the communicator 41.

The operation detector 42 receives an instruction for the information terminal 4. The operation detector 42 is operated by the user and receives an instruction from the user. The operation detector 42 outputs, to the controller 45, a signal corresponding to a user operation. As a result, the information terminal 4 performs an operation according to the operation received by the operation detector 42. The operation detector 42 includes, for example, a pointing device and a keyboard. It is noted that the operation detector 42 may include a touch sensor. The touch sensor is overlaid on a display surface of the display 43.

The display 43 displays various types of information. The display 43 is, for example, a liquid crystal display or an organic electroluminescence (EL) display. It is noted that, if the touch sensor is overlaid on the display surface of the display 43, the display 43 functions as a touch display.

The storage 44 includes a semiconductor memory such as a RAM and a ROM. Further, the storage 44 may include a storage device such as an HDD. The storage 44 stores ID information 441, a meeting program 442, and schedule information 8. Further, the storage 44 stores image data of an image used in a meeting.

Figure 12:
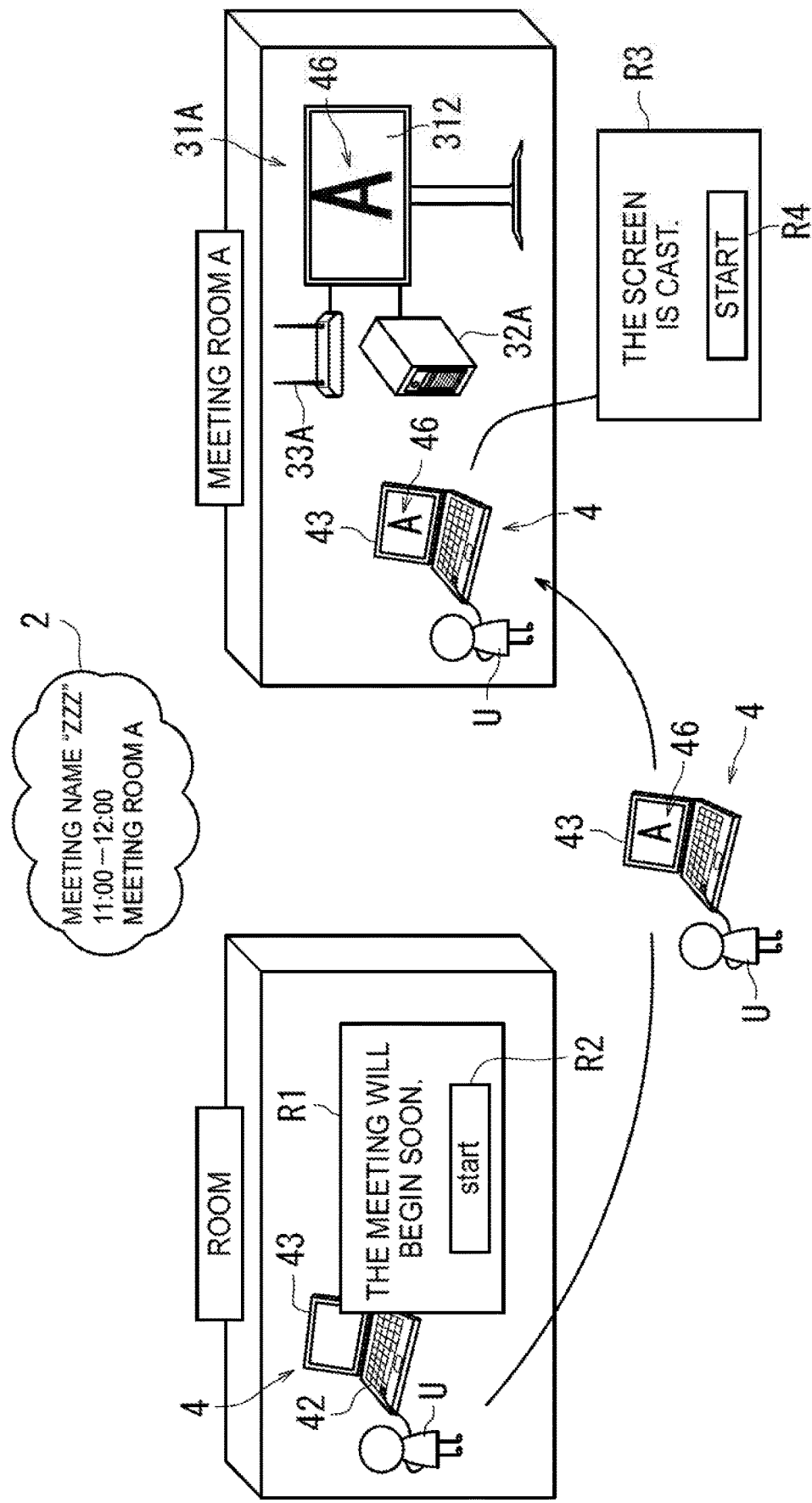
FIG. 12 is a schematic diagram illustrating an example of the operation of the information processing system.

The ID information 441 is information indicating an ID of a predetermined meeting participant U (see FIG. 12). In the first embodiment, the ID information 441 is ID "PPP".

In the first embodiment, the predetermined meeting participant U is a user of the information terminal 4.

The meeting program 442 is a program for causing the controller 45 to execute an image sharing process. The image sharing process indicates a process of displaying, on the display 312 of the display device 31 (see FIG. 2), an image displayed on the display 43 of the information terminal 4.

For example, if the meeting program 442 is installed in the information terminal 4, the ID information 441 is input from the operation detector 42. As a result, the ID information 441 is stored in the storage 44.

The schedule information 8 is information indicating a meeting schedule of the predetermined meeting participant U. The schedule information 8 will be described later.

The controller 45 includes a processor such as a CPU, an MPU, an ASIC, or a DSP. The controller 45 controls the communicator 41, the operation detector 42, the display 43, and the storage 44 based on the meeting program 442 stored in the storage 44.

Figure 9:
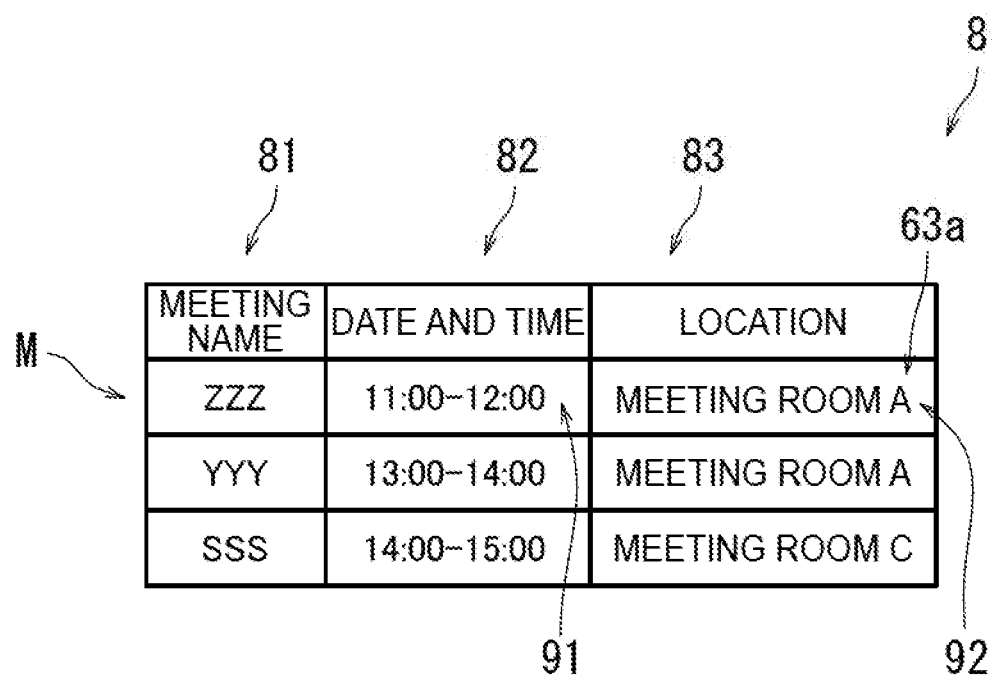

Next, the schedule information 8 will be described with reference to FIG. 9. FIG. 9 is a table showing the schedule information 8.

As illustrated in FIG. 9, the schedule information 8 is information related to a meeting in which the predetermined meeting participant U plans to participate. The schedule information 8 is information in which meeting name information 81, date-and-time information 82, and location information 83 of the meeting in which the predetermined meeting participant U plans to participate are associated.

The server 2 generates the schedule information 8 based on the management table 6 (see FIG. 7). Below, a procedure by which the server 2 generates the schedule information 8 is described.

First, the server 2 selects, in the management table 6, the management information 60 associated with the ID "PPP" of the predetermined meeting participant U. In the first embodiment, the server 2 selects the first management information 6a, the fourth management information 6d, and the fifth management information 6e. Then, the server 2 extracts, as the schedule information 8 of the predetermined meeting participant U, information in which the meeting name "ZZZ", the date and time "11:00-12:00", and the location "meeting room A" included in the first management information 6a are associated. Further, the server 2 extracts, as the schedule information 8 of the predetermined meeting participant U, information in which the meeting name "AAA", the date and time "15:00-16:00", and the location "meeting room A" included in the fourth management information 6d are associated. Further, the server 2 extracts, as the schedule information 8 of the predetermined meeting participant U, information in which the meeting name "XXX", the date and time "16:00-17:00", and the location "meeting room B" included in the fifth management information 6e are associated. As a result, the schedule information 8 of the predetermined meeting participant U is generated.

The information terminal 4 periodically performs a process of acquiring the schedule information 8 from the server 2. As a result, the schedule information 8 stored in the information terminal 4 is periodically updated.

Based on the schedule information 8, the information terminal 4 can manage the meeting schedule of the predetermined meeting participant U.

Next, an example of an operation of the information processing system 1 will be described with reference to FIGS. 9 to 12.

Figure 10:
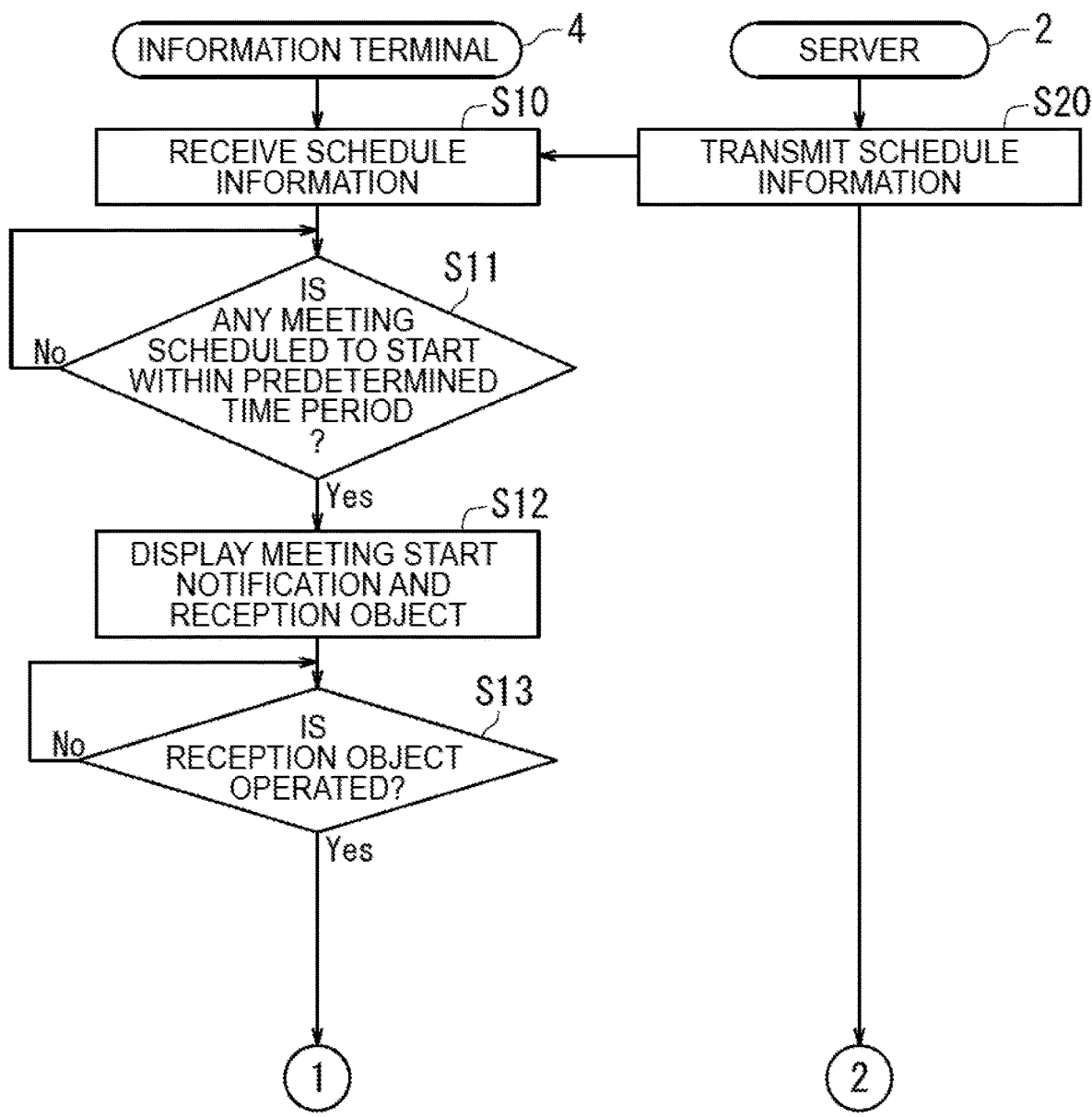
FIG. 10 is a first flowchart illustrating an example of an operation of the information processing system.
Figure 11:
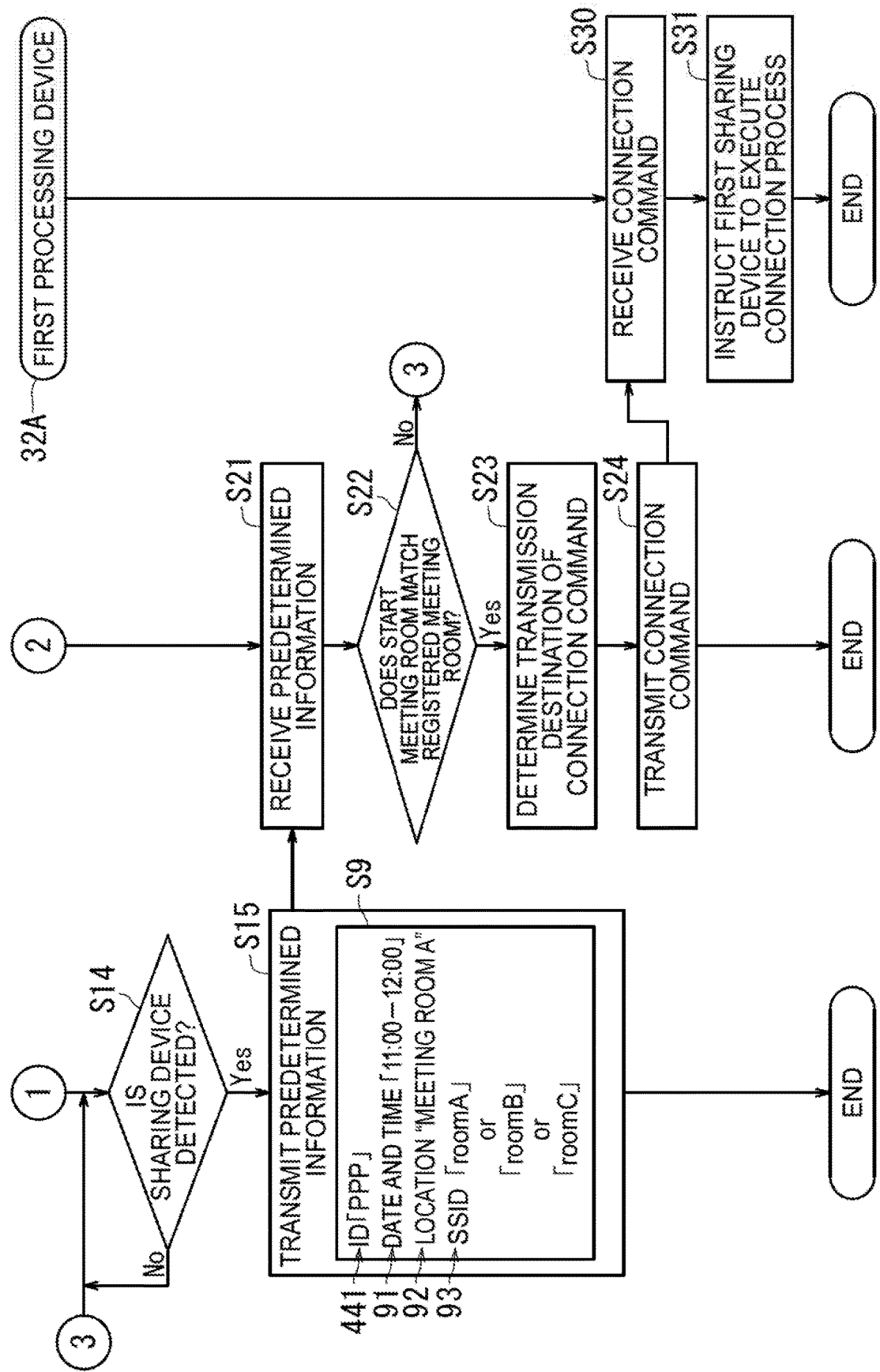
FIG. 11 is a second flowchart illustrating an example of the operation of the information processing system.

FIG. 10 is a first flowchart illustrating an example of the operation of the information processing system 1. FIG. 11 is a second flowchart illustrating an example of the operation of the information processing system 1. FIG. 12 is a schematic diagram illustrating an example of the operation of the information processing system 1.

As illustrated in FIGS. 9, 10, and 12, in step S20, the controller 23 controls the communicator 21 of the server 2 to transmit the schedule information 8 to the information terminal 4.

In step S10, the communicator 41 of the information terminal 4 receives the schedule information 8.

In step S11, the controller 45 compares the date-and-time information 82 of the schedule information 8 with the current time, and determines whether or not there is a meeting scheduled to start within a predetermined time period. The predetermined time period is predetermined. Information indicating the predetermined time period is stored in the storage 44.

In the following, among meetings set in the schedule information 8, a meeting scheduled to start within the predetermined time period from the current time may be referred to as a start meeting M.

In the first embodiment, the predetermined time period is ten minutes. Further, in the first embodiment, the start meeting M is a meeting with the meeting name "ZZZ" and starts at 11:00.

In the first embodiment, the controller 45 determines that the start meeting M does not exist in a time slot before 10:50 (No in step S11). In this case, the process illustrated in step S11 is repeated.

In the first embodiment, in a time slot from 10:50 to 11:00, the controller 45 determines that the start meeting M exists (Yes in step S11). In this case, the processing proceeds to step S12.

In step S12, the controller 45 controls the display 43 to display a meeting start notification R1 and a reception object R2.

The meeting start notification R1 is information for notifying that the start meeting M starts within the predetermined time period. When confirming the meeting start notification R1, the predetermined meeting participant U recognizes that the start meeting M exists.

In the first embodiment, the start meeting M is held in the meeting room A. Therefore, upon confirming the meeting start notification R1, the predetermined meeting participant U goes to the meeting room A.

The reception object R2 receives an input from the outside. The reception object R2 is, for example, an image representing a button. If participating in the start meeting M, the predetermined meeting participant U operates the reception object R2. Examples of the operation on the reception object R2 include a touch operation on the reception object R2, a click on the reception object R2 with a mouse, or a selection of the reception object R2 with a keyboard. In the first embodiment, the reception object R2 is an icon indicating "start".

In step S13, the controller 45 determines whether or not the reception object R2 has been operated. If the controller 45 determines that the reception object R2 has been operated (Yes in step S13), the processing proceeds to step S14 illustrated in FIG. 11. If the controller 45 determines that the reception object R2 is not operated (No in step S13), the process illustrated in step S13 is repeated.

As illustrated in FIGS. 9, 11, and 12, in step S14, the controller 45 determines whether or not the communicator 41 has detected the sharing device 33.

For example, if the predetermined meeting participant U enters the meeting room A while carrying the information terminal 4, the information terminal 4 is disposed within a range where a radio signal from the first sharing device 33A can be received. As a result, the communicator 41 of the information terminal 4 detects the first sharing device 33A.

Further, if the predetermined meeting participant U enters the meeting room B while carrying the information terminal 4 (see FIG. 5), the communicator 41 of the information terminal 4 detects the second sharing device 33B. If the predetermined meeting participant U enters the meeting room C while carrying the information terminal 4, the communicator 41 of the information terminal 4 detects the third sharing device 33C.

If the controller 45 determines that the communicator 41 has detected the sharing device 33 (Yes in step S14), the processing proceeds to step S15. That is, if the controller 45 determines that the communicator 41 has detected any one sharing device 33 of the first sharing device 33A to the third sharing device 33C (Yes in step S14), the processing proceeds to step S15.

If the controller 45 determines that the communicator 41 has not detected the sharing device 33 (No in step S14), the process illustrated in step S14 is repeated.

In step S15, the controller 45 controls the communicator 41 to transmit predetermined information 9 to the server 2.

The predetermined information 9 is information used when the server 2 determines whether or not to perform a connection process described later. The predetermined information 9 includes the ID information 441 of the predetermined meeting participant U (see FIG. 8), predetermined date-and-time information 91, information indicating a start meeting room 92, and an SSID 93 of the sharing device 33 detected by the communicator 41 of the information terminal 4.

In the first embodiment, the ID information 441 of the predetermined meeting participant U is the ID "PPP".

The predetermined date-and-time information 91 indicates the date and time when the start meeting M is held. The predetermined date-and-time information 91 indicates the date-and-time information 82 of the start meeting M registered in the schedule information 8. In the first embodiment, the predetermined date-and-time information 91 is a date and time "11:00-12:00".

The start meeting room 92 indicates a location where the start meeting M is held. The start meeting room 92 indicates the location information 83 of the start meeting M registered in the schedule information 8. In the first embodiment, the start meeting room 92 is the location "meeting room A".

If the predetermined meeting participant U enters the meeting room A, the SSID 93 included in the predetermined information 9 is the SSID "roomA". If the predetermined meeting participant U enters the meeting room B, the SSID 93 included in the predetermined information 9 is the SSID "roomB". If the predetermined meeting participant U enters the meeting room C, the SSID 93 included in the predetermined information 9 is the SSID "roomC".

If the process illustrated in step S15 ends, the processing of the information terminal 4 ends.

In step S21, the communicator 21 of the server 2 receives the predetermined information 9.

In step S22, the controller 23 of the server 2 determines whether or not the start meeting room 92 matches a registered meeting room.

In the management table 6 (see FIG. 7), the registered meeting room is the location information 63 associated with the ID information 441, the predetermined date-and-time information 91, and the SSID 93 included in the predetermined information 9.

If the predetermined meeting participant U enters the meeting room A, the ID information 441 is the ID "PPP", the date-and-time information 82 is the date and time "11:00-12:00", and the SSID 93 is the SSID "roomA" in the predetermined information 9. In this case, the location information 63 associated with the ID "PPP", the date and time "11:00-12:00", and the SSID "roomA" in the management table 6 is the location "meeting room A". In this case, a registered meeting room 63a is the location "meeting room A", and thus, the registered meeting room 63a matches the location "meeting room A" being the start meeting room 92. Therefore, the controller 23 determines that the start meeting room 92 matches the registered meeting room 63a (Yes in step S22). As a result, the processing proceeds to step S23.

If the predetermined meeting participant U enters the meeting room B, the ID information 441 is the ID "PPP", the date-and-time information 82 is the date and time "11:00-12:00", and the SSID 93 is the SSID "roomB" in the predetermined information 9. In this case, the location information 63 associated with the ID "PPP", the date and time "11:00-12:00", and the SSID "roomB" is not in the management table 6. Therefore, there is no registered meeting room. As a result, the controller 23 determines that the start meeting room 92 does not match the registered meeting room (No in step S22). In this case, the processing proceeds to step S14.

If the predetermined meeting participant U enters the meeting room C, the ID information 441 is the ID "PPP", the date-and-time information 82 is the date and time "11:00-12:00", and the SSID 93 is the SSID "roomC" in the predetermined information 9. In this case, the location information 63 associated with the ID "PPP", the date and time "11:00-12:00", and the SSID "roomC" is not in the management table 6. Therefore, there is no registered meeting room. As a result, the controller 23 determines that the start meeting room 92 does not match the registered meeting room (No in step S22). In this case, the processing proceeds to step S14.

In step S23, the controller 23 determines a transmission destination of a connection command. The controller 23 determines, as the transmission destination of the connection command, the processing device 32 having a predetermined IP address 64a.

The predetermined IP address 64a indicates an IP address associated with the registered meeting room 63a in the management table 6. In the first embodiment, the registered meeting room 63a is the location "meeting room A". Therefore, the predetermined IP address 64a is the IP address "α" associated with the registered meeting room 63a.

In the first embodiment, the processing device 32 having the IP address "α" is the first processing device 32A. Therefore, the controller 23 determines the first processing device 32A as the transmission destination of the connection command.

The connection command is a command for instructing the first sharing device 33A to execute the connection process. The connection process includes a first process and a second process. The first process is a process of connecting the information terminal 4 to the first sharing device 33A. The second process is a process of displaying, on the first display device 31A, the image being displayed on the information terminal 4.

In step S24, the controller 23 controls the communicator 21 to transmit the connection command to the first processing device 32A.

If the process illustrated in step S24 ends, the processing of the server 2 ends.

In step S30, the communicator 321 of the first processing device 32A receives the connection command.

In step S31, the controller 324 of the first processing device 32A instructs the first sharing device 33A to execute the connection process.

The first sharing device 33A executes the first process of the connection process to perform a process of wirelessly connecting the information terminal 4 to the first sharing device 33A. Therefore, the first sharing device 33A is wirelessly connected to the information terminal 4. As a result, image data of a display image 46 is wirelessly transmitted from the information terminal 4 to the first sharing device 33A. The display image 46 is an image being displayed on the display 43 of the information terminal 4.

The first sharing device 33A executes the second process of the connection process to display the display image 46 on the display 312 of the first display device 31A. As a result, the display image 46 being displayed on the information terminal 4 is shared among meeting participants through the first display device 31A.

If the process illustrated in step S31 ends, the processing of the first processing device 32A ends.

As described above with reference to FIGS. 9 to 12, in steps S11, S14, and S15, if the information terminal 4 determines that the start meeting M exists and if the information terminal 4 detects the sharing device 33, the information terminal 4 transmits the predetermined information 9 to the server 2. In steps S22 to S24, the server 2 determines, based on the predetermined information 9 and the management table 6, whether or not to cause the sharing device 33 to execute the connection process. In step S31, if the sharing device 33 executes the connection process, the information terminal 4 is wirelessly connected to the sharing device 33. Therefore, the information terminal 4 is wirelessly connected to the sharing device 33 without the user performing connection work, and thus, the information terminal 4 can be wirelessly connect to the sharing device 33 in an easy manner.

Further, in step S22, if the start meeting M matches the registered meeting, the sharing device 33 executes the connection process. Therefore, if a meeting is held in which the predetermined meeting participant U is not registered as a meeting participant in the management table 6, even if the predetermined meeting participant U participates in the meeting, the sharing device 33 can be prevented from executing the connection process.

Further, in steps S11 and S13, if the information terminal 4 determines that the start meeting M exists, the information terminal 4 displays the reception object R2. If the reception object R2 is operated and if the information terminal 4 detects the sharing device 33 installed in the start meeting M, the information terminal 4 is wirelessly connected to the sharing device 33 installed in the start meeting M. Therefore, the information terminal 4 can be wirelessly connected to the sharing device 33 based on the intention of the predetermined meeting participant U. Further, the information terminal 4 can be prevented from being wirelessly connected to the sharing device 33 by mistake.

It is noted that, between the process illustrated in step S30 and the process illustrated in step S31, a first confirmation process, a second confirmation process, a third confirmation process, and a fourth confirmation process may be performed. A procedure for performing the first confirmation process, the second confirmation process, the third confirmation process, and the fourth confirmation process will be described.

The first confirmation process is performed after the process illustrated in step S30 ends. In the first confirmation process, a reception confirmation signal indicating that the first processing device 32A has received the connection command is transmitted from the first processing device 32A to the information terminal 4. As a result, the information terminal 4 receives the reception confirmation signal. Then, the second confirmation process is performed.

In the second confirmation process, a confirmation screen R3 is displayed on the display 43 of the information terminal 4. The confirmation screen R3 is a screen for the meeting participant U to confirm that the execution of the connection process is started. Information indicating that the execution of the connection process is started is displayed on the confirmation screen R3. A start object R4 is displayed on the confirmation screen R3. The meeting participant U confirms the confirmation screen R3 to recognize that a preparation for displaying, on the display 312 of the first display device 31A, the display image 46 being displayed on the display 43 of the information terminal 4, is completed. Then, the third confirmation process is performed.

In the third confirmation process, the start object R4 receives an input from the outside. Specifically, the start object R4 receives a touch operation by the meeting participant U. As a result, an instruction signal for instructing a start of the connection process is transmitted from the information terminal 4 to the first processing device 32A. As a result, the first processing device 32A receives the instruction signal. Then, the fourth confirmation process is performed.

In the fourth confirmation process, when receiving the instruction signal, the first processing device 32A determines that the meeting participant U has confirmed that the connection process is started. Then, the first processing device 32A performs the process illustrated in step S31.

Second Embodiment

Next, the information processing system 1 according to a second embodiment of the present disclosure will be described with reference to FIG. 13.

The second embodiment is different from the first embodiment in that an operation on the reception object R2 is unnecessary. Below, differences from the first embodiment will be mainly described.

A second example of the operation of the information processing system 1 will be described with reference to FIG. 13. FIG. 13 is a flowchart illustrating the second example of the operation of the information processing system 1.

Figure 13:
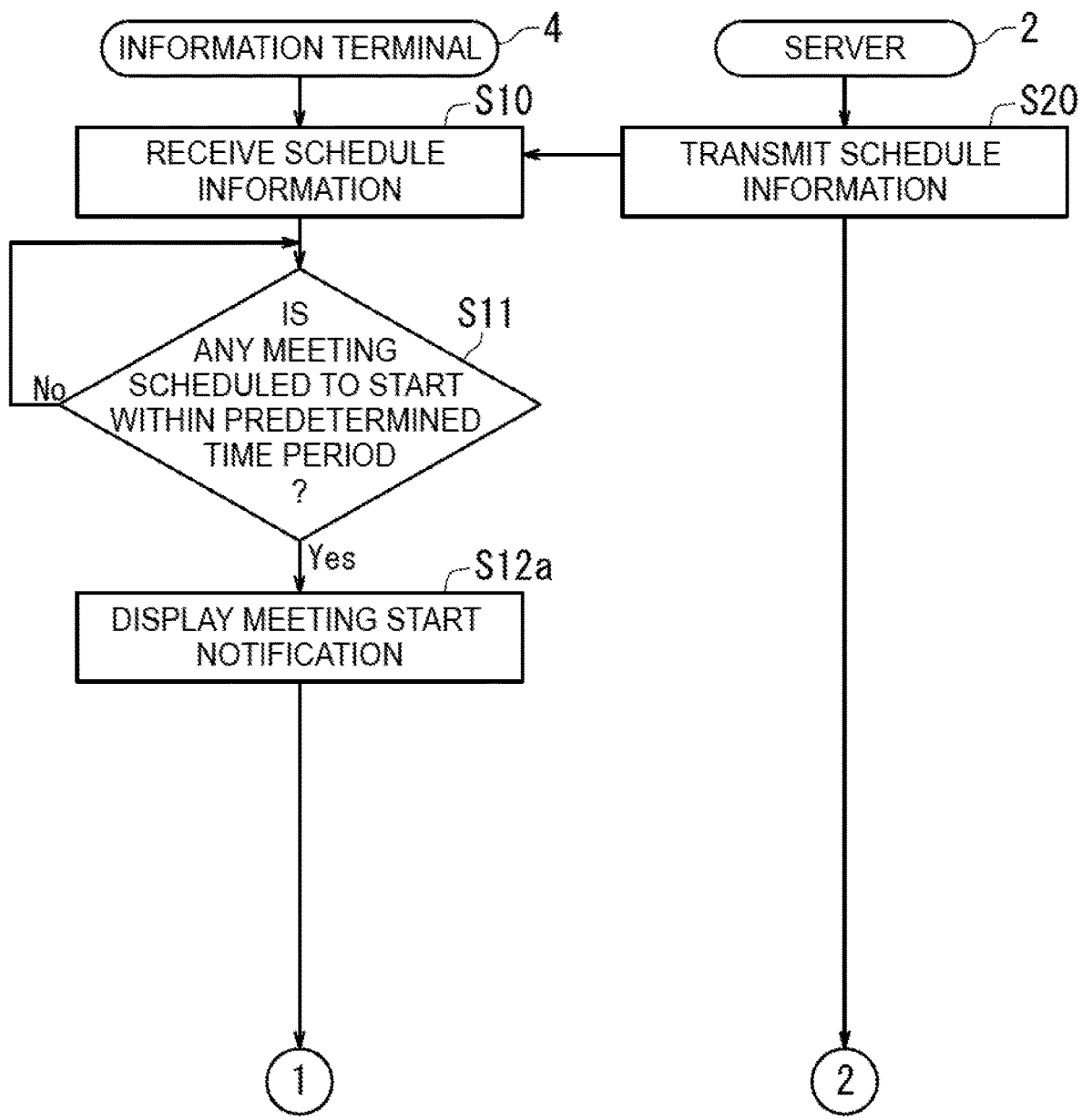
FIG. 13 is a flowchart illustrating a second example of the operation of the information processing system.

As illustrated in FIG. 13, if the process illustrated in step S11 ends, the processing proceeds to step S12a.

In step S12a, the controller 45 controls the display 43 to display the meeting start notification R1. If the process illustrated in step S12a ends, the processing proceeds to step S14 illustrated in FIG. 11. That is, the process of detecting the sharing device 33 is started even if the reception object R2 is not operated as in the first embodiment.

As described above with reference to FIG. 13, if the information terminal 4 determines that the start meeting M exists and if the information terminal 4 detects the sharing device 33 installed in the start meeting M, the information terminal 4 is wirelessly connected to the sharing device 33 installed in the start meeting M. Therefore, the connection process is started even if the predetermined meeting participant U arrives at the meeting room A unintentionally, and thus, the connection process can be performed more smoothly.

Third Embodiment

Next, the information processing system 1 according to a third embodiment of the present disclosure will be described with reference to FIG. 14.

The third embodiment is different from the first embodiment in that, instead of the operation on the reception object R2, an operation of setting the information terminal 4 to a sleep mode and an operation of cancelling the sleep mode of the information terminal 4 are performed. Below, differences from the first embodiment will be mainly described.

A third example of the operation of the information processing system 1 will be described with reference to FIG. 14. FIG. 14 is a flowchart illustrating the third example of the operation of the information processing system 1.

Figure 14:
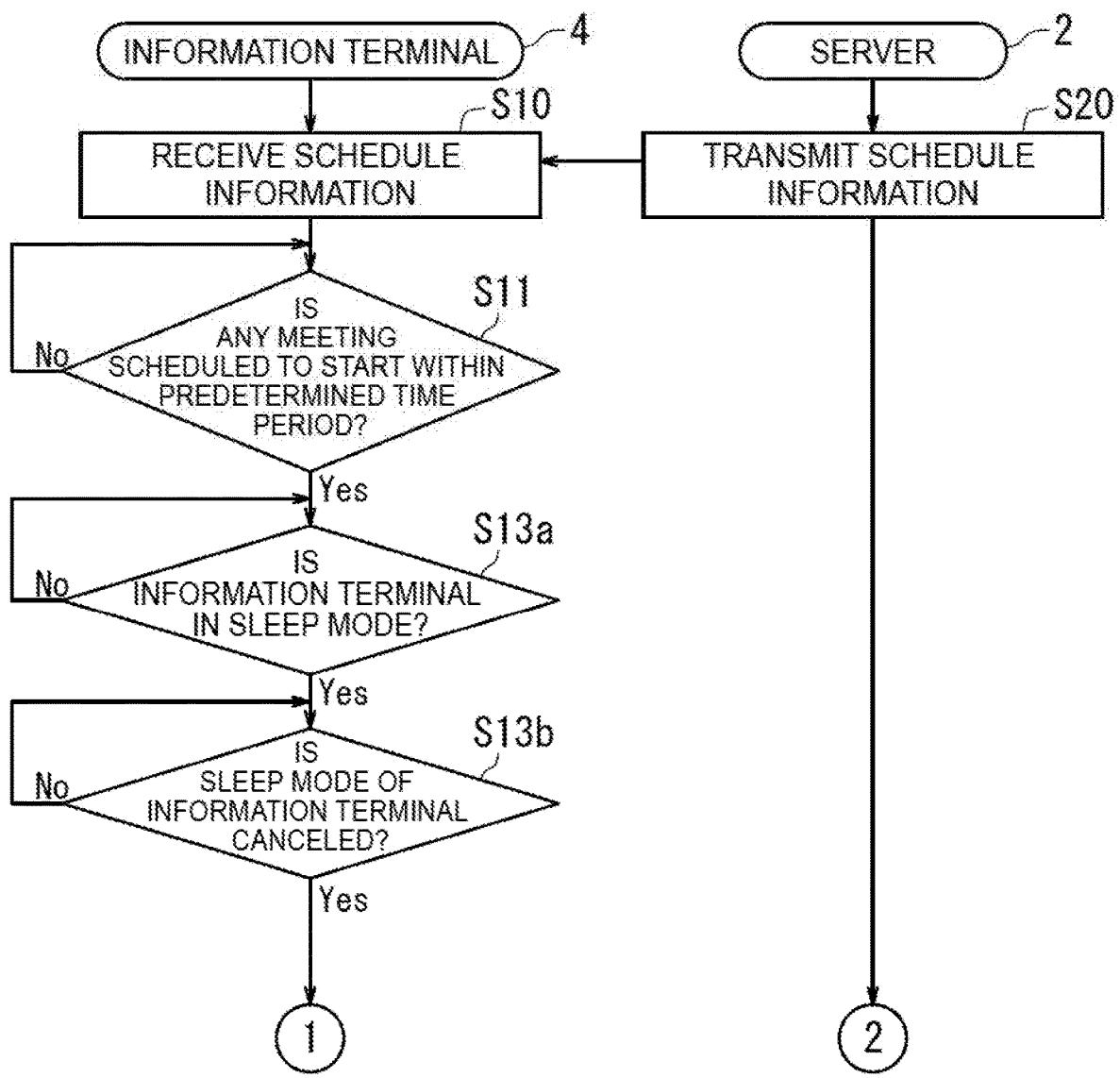
FIG. 14 is a flowchart illustrating a third example of the operation of the information processing system.

As illustrated in FIG. 14, if the process illustrated in step S11 ends, the processing proceeds to step S13a.

In step S13a, the controller 45 determines whether or not the information terminal 4 is in the sleep mode. For example, if the information terminal 4 is a notebook PC, the information terminal 4 enters the sleep mode if the information terminal 4 is closed.

If the controller 45 determines that the information terminal 4 is in the sleep mode (Yes in step S13a), the processing proceeds to step S13b. If the controller 45 determines that the information terminal 4 is not in the sleep mode (No in step S13a), the process illustrated in step S13a is repeated.

In step S13b, the controller 45 determines whether or not the sleep mode of the information terminal 4 has been canceled. For example, if the information terminal 4 is a notebook PC, the sleep mode of the information terminal 4 is canceled if the information terminal 4 is opened from a closed state.

If the controller 45 determines that the sleep mode of the information terminal 4 is canceled (Yes in step S13b), the processing proceeds to step S14 illustrated in FIG. 11. If the controller 45 determines that the sleep mode of the information terminal 4 has not been canceled (No in step S13b), the process illustrated in step S13b is repeated.

As described above with reference to FIG. 14, if the information terminal 4 determines that the start meeting M exists, the sleep mode is canceled after the information terminal 4 is set to the sleep mode, and if the information terminal 4 detects the sharing device 33 installed in the start meeting M, the information terminal 4 is wirelessly connected to the sharing device 33 installed in the start meeting M. Therefore, if the information terminal 4 is a notebook PC, an operation that the user normally performs such as closing the notebook PC and opening the notebook PC can be a trigger operation for starting a detection process by the sharing device 33. As a result, it is possible to reduce the burden of the trigger operation for the user. Further, the information terminal 4 can be prevented from being wirelessly connected to the sharing device 33 by mistake.

Fourth Embodiment

Next, the information processing system 1 according to a fourth embodiment of the present disclosure will be described with reference to FIG. 15.

The fourth embodiment is different from the first embodiment in that, instead of the operation on the reception object R2, it is confirmed whether or not a person is a person who has issued an invitation for the start meeting M. The person who has issued the invitation for the start meeting M indicates, for example, a person who has sent an invitation mail for the start meeting M to a meeting participant via the server 2. The server 2 can identify the person who has issued the invitation for the start meeting M, based on an ID of a sender recorded in a sender field of the invitation mail for the start meeting M. Information indicating whether or not the person is the person who has issued the invitation for the start meeting M, is registered in each of the management table 6 and the schedule information 8.

Below, differences from the first embodiment will be mainly described.

A fourth example of the operation of the information processing system 1 will be described with reference to FIG. 15. FIG. 15 is a flowchart illustrating the fourth example of the operation of the information processing system 1.

Figure 15:
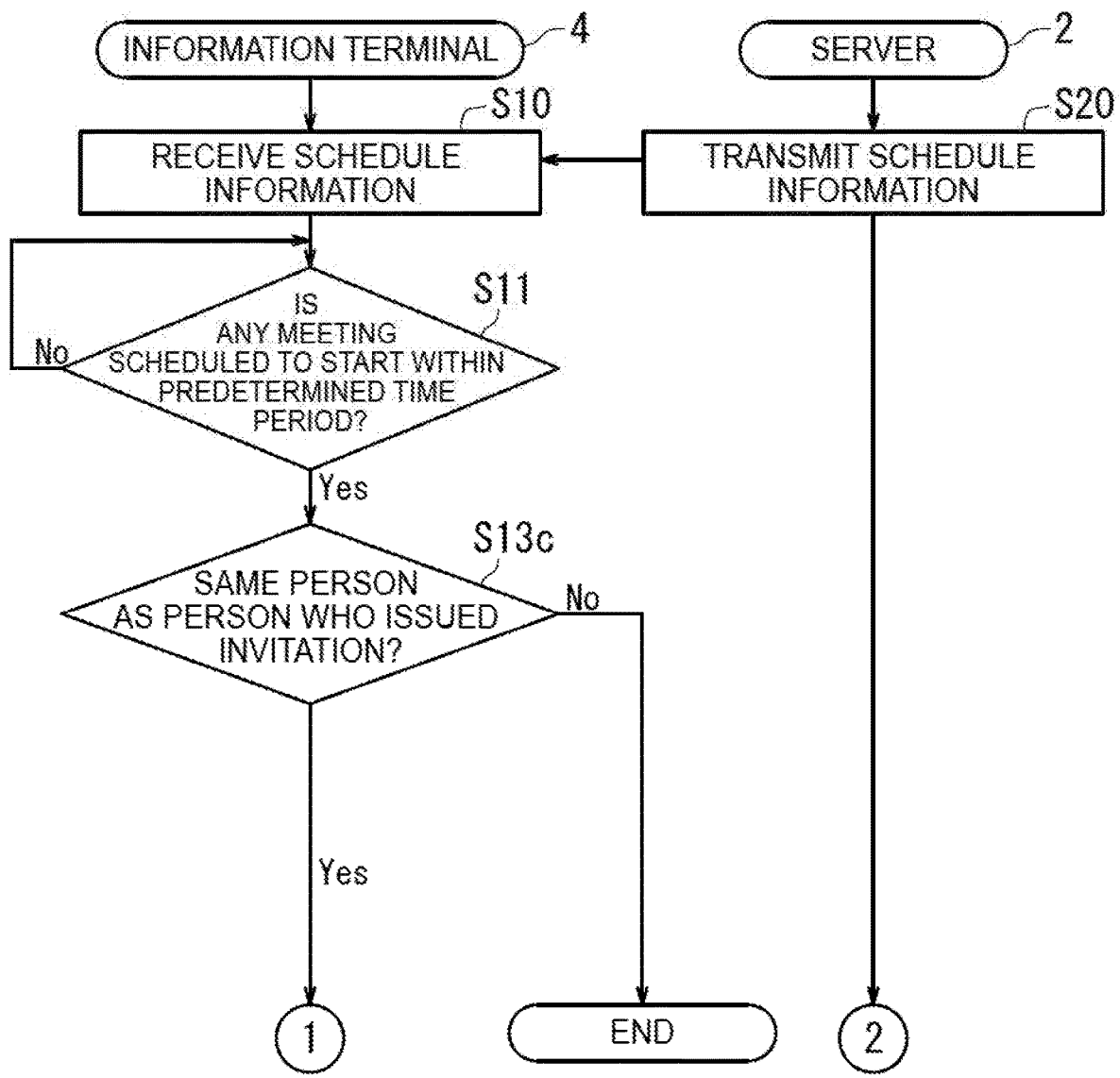
FIG. 15 is a flowchart illustrating a fourth example of the operation of the information processing system.

As illustrated in FIG. 15, if the process illustrated in step S11 ends, the processing proceeds to step S13c.

In step S13c, the controller 45 of the information terminal 4 determines, based on the schedule information 8, whether or not the predetermined meeting participant U is the person who has issued the invitation for the start meeting M.

If the controller 45 determines that the person is the person who has issued the invitation for the start meeting M (Yes in step S13c), the processing proceeds to step S14 illustrated in FIG. 11.

If the controller 45 determines that the person is not the person who has issued the invitation for the start meeting M (No in step S13c), the processing ends. In this case, as illustrated in FIG. 12, even if the predetermined meeting participant U brings the information terminal 4 into the meeting room A, the information terminal 4 is not connected to the first sharing device 33A. As a result, the display image 46 is not displayed on the first display device 31A.

As described above with reference to FIG. 15, if the information terminal 4 determines that the start meeting M exists, and the information terminal 4 receives a reply indicating that the person is the person who has issued the invitation for the start meeting M, and if the information terminal 4 detects the sharing device 33 installed in the start meeting M, the information terminal 4 is wirelessly connected to the sharing device 33 installed in the start meeting M. Therefore, for example, if a rule that the person who has issued the invitation for the start meeting M is a presenter in the start meeting M is applied, a person other than the presenter can be prevented from being authorized to display an image on the display device 31.

Fifth Embodiment

Figure 16:
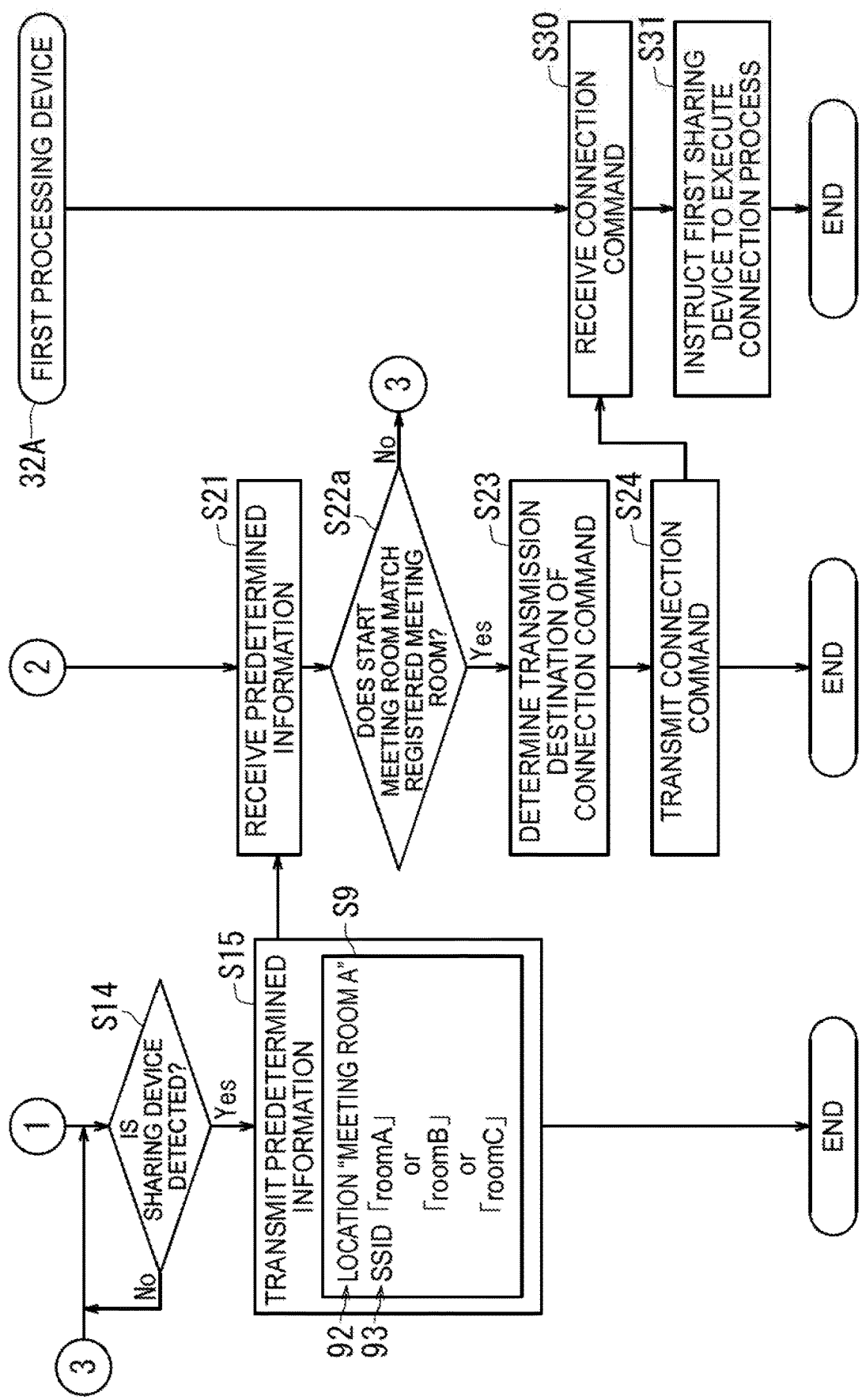
FIG. 16 is a flowchart illustrating a modification of the first to fourth examples of the operation of the information processing system.

Next, the information processing system 1 according to a fifth embodiment of the present disclosure will be described with reference to FIG. 16. FIG. 16 is a flowchart illustrating a modification of the first to fourth examples of the operation of the information processing system 1.

The fifth embodiment is different from the first to fourth embodiments in that the predetermined information 9 does not include the ID information 441 and the predetermined date-and-time information 91. Below, differences from the first embodiment will be mainly described.

As illustrated in FIG. 16, in the case of Yes in step S14, the processing proceeds to step S15a.

In step S15a, the controller 45 controls the communicator 41 to transmit the predetermined information 9 to the server 2.

The predetermined information 9 of the fifth embodiment includes information indicating the start meeting room 92, and the SSID 93 of the sharing device 33 detected by the communicator 41.

If the process illustrated in step S15a ends, the processing of the information terminal 4 ends.

In step S21, the communicator 21 of the server 2 receives the predetermined information 9.

In step S22a, the controller 23 of the server 2 determines whether or not the start meeting room 92 matches the registered meeting room.

The start meeting room 92 of the fifth embodiment is the same as the start meeting room 92 of the first embodiment. Therefore, the start meeting room 92 of the fifth embodiment is the location "meeting room A".

In the management table 6 (see FIG. 7), the registered meeting room of the fifth embodiment is the location information 63 associated with the SSID 93 included in the predetermined information 9.

If the predetermined meeting participant U enters the meeting room A, the SSID 93 is the SSID "roomA" in the predetermined information 9. In this case, the location information 63 associated with the SSID "roomA" is the location "meeting room A" in the management table 6. In this case, the registered meeting room is the location "meeting room A", and thus, the registered meeting room matches the location "meeting room A" being the start meeting room 92. Therefore, the controller 23 determines that the start meeting room 92 matches the registered meeting room (Yes in step S22). As a result, the processing proceeds to step S23.

If the predetermined meeting participant U enters the meeting room B, the SSID 93 is the SSID "roomB" in the predetermined information 9. In this case, the location information 63 associated with the SSID "roomB" is the location "meeting room B" in the management table 6. In this case, the registered meeting room is the location "meeting room B", and thus, the registered meeting room does not match the location "meeting room A" being the start meeting room 92. Therefore, the controller 23 determines that the start meeting room 92 does not match the registered meeting room (No in step S22). As a result, the processing proceeds to step S14.

If the predetermined meeting participant U enters the meeting room C, the SSID 93 is the SSID "roomC" in the predetermined information 9. In this case, the location information 63 associated with the SSID "roomC" is the location "meeting room C" in the management table 6. In this case, the registered meeting room is the location "meeting room C", and thus, the registered meeting room does not match the location "meeting room A" being the start meeting room 92. Therefore, the controller 23 determines that the start meeting room 92 does not match the registered meeting room (No in step S22). In this case, the processing proceeds to step S14.

As described above with reference to FIG. 16, the predetermined information 9 includes information indicating the start meeting room 92, and the SSID 93. Therefore, the predetermined information 9 can be configured simply, as compared with the first embodiment.

It is noted that, also in the second to fourth embodiments, the process illustrated in step S15a and the process illustrated in step S22a may be performed instead of the process illustrated in step S15 and the process illustrated in step S22.

Sixth Embodiment

Next, the information processing system 1 according to a sixth embodiment of the present disclosure will be described with reference to FIGS. 17 and 18. The sixth embodiment is a modification of the first embodiment.

The sixth embodiment is different from the first embodiment in that the server 2 notifies the information terminal 4 of the start meeting M.

The sixth embodiment is different from the first embodiment in that the schedule information 8 (see FIG. 8) is not stored in the storage 44 of the information terminal 4. That is, in the sixth embodiment, instead of the information terminal 4, the server 2 manages the meeting schedule of the predetermined meeting participant U. Below, differences from the first embodiment will be mainly described.

A fifth example of the operation of the information processing system 1 will be described with reference to FIGS. 7, 17 and 18. FIG. 17 is a first flowchart illustrating the fifth example of the operation of the information processing system 1. FIG. 18 is a second flowchart illustrating the fifth example of the operation of the information processing system 1.

Figure 17:
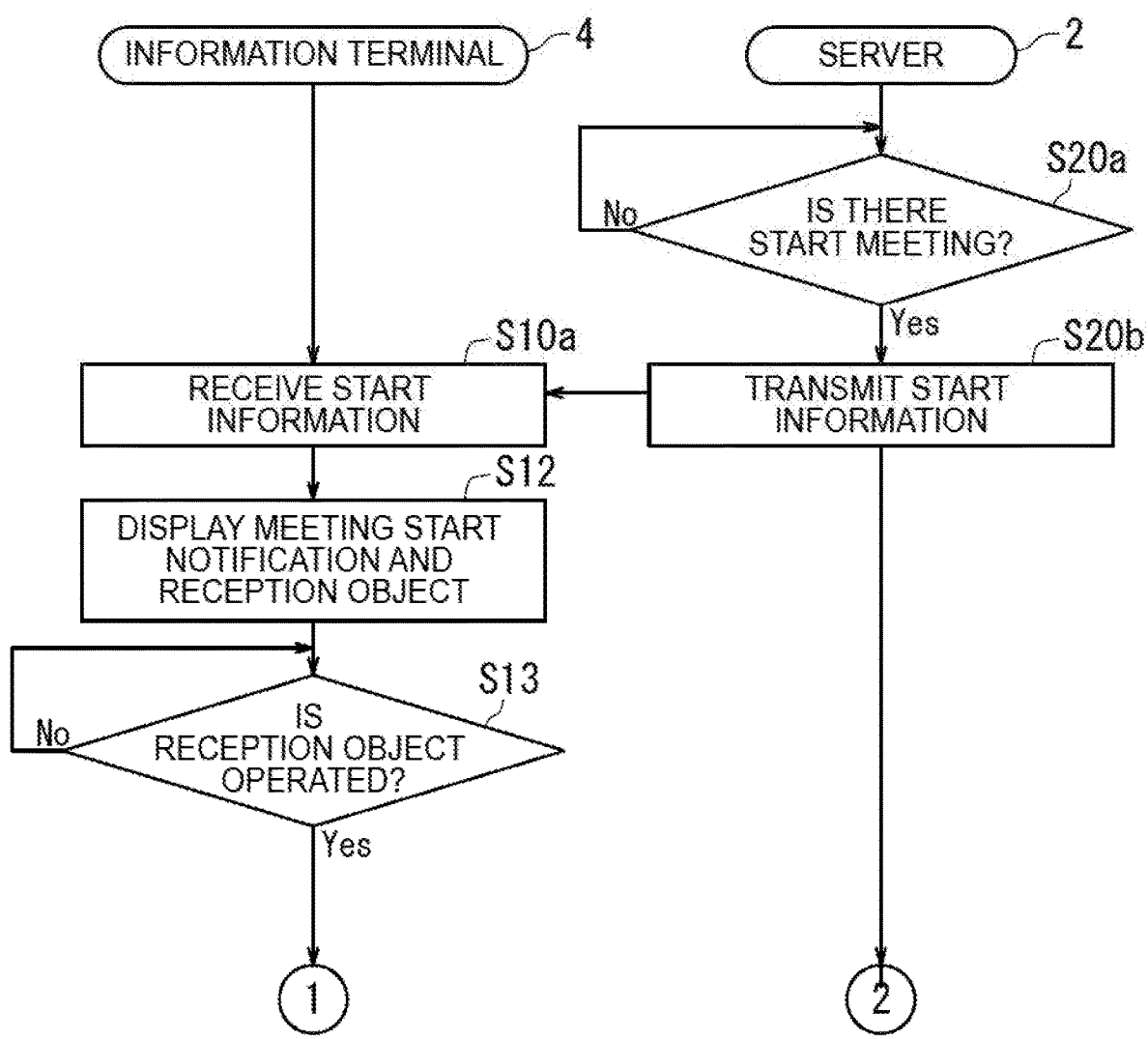
FIG. 17 is a first flowchart illustrating a fifth example of the operation of the information processing system.

As illustrated in FIG. 17, in step S20a, the controller 23 of the server 2 compares the date-and-time information 62 in the management table 6 (see FIG. 7) with the current time to determine whether or not the start meeting M exists.

If the controller 23 determines that the start meeting M does not exist (No in step S20a), the process illustrated in step S20a is repeated.

If the controller 23 determines that the start meeting M exists (Yes in step S20a), the processing proceeds to step S20b. In the sixth embodiment, the start meeting M is a meeting with the meeting name "ZZZ".

In step S20b, the controller 23 controls the communicator 21 to transmit start information to the information terminal 4. The start information is information indicating that the start meeting M starts within the predetermined time period.

In step S10a, the communicator 41 of the information terminal 4 receives the start information. As a result, the information terminal 4 recognizes that the start meeting M starts within the predetermined time period. If the process illustrated in step S10a ends, the processing proceeds to step S12.

Figure 18:
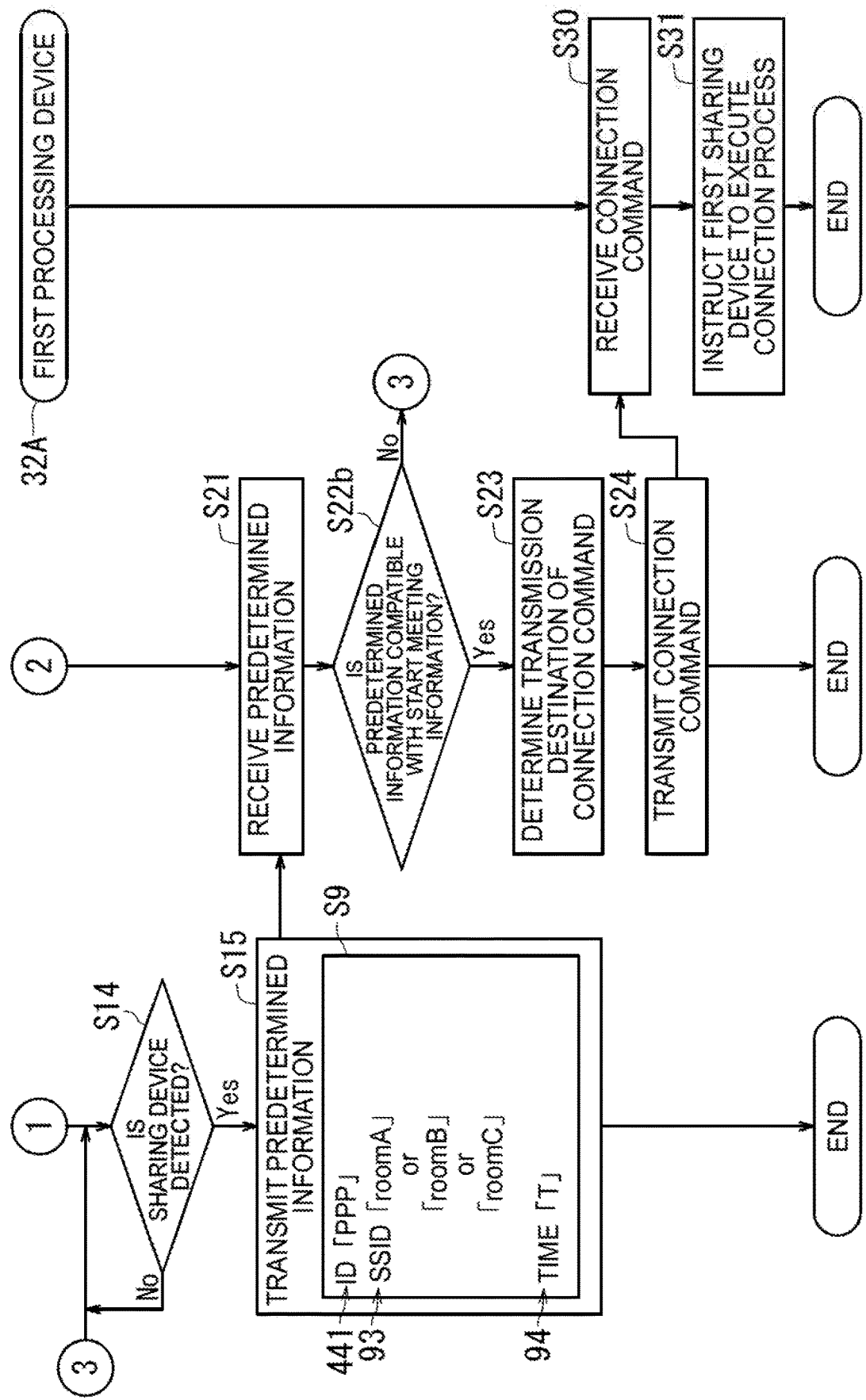
FIG. 18 is a second flowchart illustrating the fifth example of the operation of the information processing system.

As illustrated in FIG. 18, in the case of Yes in step S14, the processing proceeds to step S15b.

In step S15b, the controller 45 controls the communicator 41 to transmit the predetermined information 9 to the server 2.

The predetermined information 9 of the sixth embodiment includes the ID information 441, the SSID 93 of the sharing device 33 detected by the communicator 41, and time information 94.

The time information 94 indicates a time when the predetermined information 9 is transmitted from the information terminal 4 to the server 2. In the sixth embodiment, the time information 94 is a time "T".

If the process illustrated in step S15b ends, the processing of the information terminal 4 ends.

In step S21, the communicator 21 of the server 2 receives the predetermined information 9.

In step S22b, the controller 23 of the server 2 determines whether or not the predetermined information 9 is compatible with start meeting information N.

The start meeting information N will be described with reference to FIG. 7.

As illustrated in FIG. 7, the start meeting information N is included in the management table 6. The start meeting information N is information related to the start meeting M.

The start meeting information N includes first information N1, second information N2, and third information N3.

The first information N1 indicates the ID information 66 of a participant in the start meeting M. In the sixth embodiment, IDs indicated by the first information N1 include ID "PPP" and ID "QQQ".

The second information N2 indicates the date-and-time information 62 of the start meeting M. In the second embodiment, the date and time indicated by the second information N2 is the date and time "11:00-12:00".

The third information N3 indicates the SSID 65 of the start meeting M. In the sixth embodiment, the SSID indicated by the third information N3 is the SSID "roomA".

As illustrated in FIGS. 7 and 18, the fact that the predetermined information 9 is compatible with the start meeting information N indicates that a first condition, a second condition, and a third condition are satisfied.

Satisfaction of the first condition indicates that the ID "PPP" being the ID information 441 of the predetermined information 9 matches any one ID of the ID "PPP" and the ID "QQQ" indicated by the first information N1. In the sixth embodiment, the ID "PPP" matches the ID in the ID information 441 and the first information N1, and thus, the first condition is satisfied.

Satisfaction of the second condition indicates that the time "T" being the time information 94 of the predetermined information 9 is a time before an end time "12:00" of the date and time "11:00-12:00" indicated by the second information N2. In the sixth embodiment, if the time "T" of the time information 94 is a time before the end time "12:00", the second condition is satisfied.

Satisfaction of the third condition indicates that the SSID 93 of the predetermined information 9 matches the SSID "roomA" indicated by the third information N3.

If the first to third conditions are all satisfied, the controller 23 determines that the predetermined information 9 is compatible with the start meeting information N (Yes in step S22b). As a result, the processing proceeds to step S23.

If at least one of the first to third conditions is not satisfied, the controller 23 determines that the predetermined information 9 is not compatible with the start meeting information N (No in step S22b). As a result, the processing proceeds to step S14.

As described above with reference to FIGS. 17 and 18, if the server 2 determines that the predetermined information 9 is compatible with the start meeting information N, the sharing device 33 executes the connection process. Therefore, the information terminal 4 can be wirelessly connected to the sharing device 33 in an easy manner.

It is noted that, in a modification of the second to fourth embodiments, a configuration may be such that the server 2 notifies the information terminal 4 of the start meeting M, as illustrated in steps S20a, S20b, and S10a of the sixth embodiment, instead of steps S10, S11, and S20. In this case, a configuration may be such that, if the server 2 determines that the predetermined information 9 is compatible with the start meeting information N, the sharing device 33 executes the connection process, as illustrated in steps S15b and S22b of the sixth embodiment, instead of steps S15 and S22.

It is noted that, in a modification of the fourth embodiment, if the processes illustrated in steps S20a, S20b, and S10a of the sixth embodiment are performed, unlike step S13c of the fourth embodiment (see FIG. 15), the server 2 performs a process of determining whether or not a person is the person who has issued the invitation. If the server 2 determines that the person is the person who has issued the invitation, the server 2 transmits the start information to the information terminal 4. On the other hand, if the server 2 determines that the person is not the person who has issued the invitation, the server 2 does not transmit the start information to the information terminal 4 and the processing ends.

The embodiments of the present disclosure have been described above with reference to the drawings (FIGS. 1 to 18). However, the present disclosure is not limited to the above-described embodiments, and can be implemented in other configurations (for example, the following (1)) without departing from the spirit of the present disclosure. In addition, various configurations of the present disclosure may be made by appropriately combining a plurality of constituent elements disclosed in the above-described embodiments. For example, among all the constituent elements illustrated in the embodiments, some constituent elements may be omitted. The drawings schematically illustrate the respective constituent elements mainly for the sake of easy understanding, and the number or the like of each of the constituent elements illustrated may be different from the actual ones on account of preparation of the drawings. Further, the constituent elements illustrated in the above-described embodiments are merely examples, and are not particularly limited, and various modifications can be made without substantially departing from the advantageous effects of the present disclosure.

In the first to fifth embodiments, the display device 31 is used as an example of an output device of the present disclosure. However, the output device is not limited to this. The output device may be any device that outputs information.

The output device may be, for example, an audio output device that outputs a sound. The audio output device includes, for example, a speaker. In this case, if the information terminal 4 executes the connection process, audio data related to the meeting is transmitted from the information terminal 4 to the sharing device 33. Then, the sharing device 33 causes the audio output device to output a sound indicated by the audio data. As a result, the sound is shared among the meeting participants via the audio output device.

What is claimed is:

1. An information processing system comprising:
a server that stores a management table for managing a meeting;
an information terminal capable of communicating with the server; and a sharing device that is communicably connected to the server and that communicates with the information terminal according to an instruction from the server, wherein the management table includes information in which location information indicating a location where a meeting is held and identification information of the sharing device installed at the location where the meeting is held are associated, in a case where a start meeting exists, when the information terminal detects the sharing device being communicably connected to the server, the information terminal transmits predetermined information including the identification information of the detected sharing device to the server, the start meeting indicates a meeting scheduled to start within a predetermined time period from a current time, the server transmits to the sharing device, based on the predetermined information and the management table, a connection instruction to communicate with the information terminal, the connection instruction being an instruction to cause the sharing device to execute a connection process, and when the sharing device receives the connection instruction, the sharing device executes the connection process to cause the sharing device and the information terminal to wirelessly connect to each other.

2. The information processing system according to claim 1, wherein the information terminal determines whether or not the start meeting exists, based on schedule information indicating a meeting schedule of a predetermined meeting participant, and when the information terminal determines that the start meeting exits, the information terminal transmits the predetermined information to the server.

3. The information processing system according to claim 2, wherein the predetermined information further includes identification information of the predetermined meeting participant, predetermined date-and-time information, and information indicating a start meeting room, the predetermined date-and-time information indicates date-and-time information of the start meeting registered in the schedule information, the start meeting room indicates location information of the start meeting registered in the schedule information, when the start meeting room matches a registered meeting room, the server transmits the connection instruction to the sharing device, and the registered meeting room indicates location information associated with the identification information, the predetermined date-and-time information, and the identification information of the predetermined meeting participant in the management table.

4. The information processing system according to claim 3, wherein the sharing device is installed in the start meeting room, when the information terminal determines that the start meeting exists, the information terminal displays a reception object, and when the reception object is operated, the information terminal is wirelessly connected to the sharing device.

5. The information processing system according to claim 3, wherein the sharing device is installed in the start meeting room, and when a sleep mode is canceled after the information terminal is set to the sleep mode, the information terminal is wirelessly connected to the sharing device.

6. The information processing system according to claim 3, wherein the sharing device is installed in the start meeting room, and when the information terminal receives a reply indicating that a person is a person who has issued an invitation for the start meeting, the information terminal is wirelessly connected to the sharing device.

7. The information processing system according to claim 2, wherein the predetermined information further includes information indicating a start meeting room, the start meeting room indicates location information of the start meeting registered in the schedule information, when the start meeting room matches a registered meeting room, the server transmits the connection instruction to the sharing device, and the registered meeting room indicates location information associated with the identification information of the sharing device in the management table.

8. The information processing system according to claim 1, wherein the management table includes information indicating a meeting schedule of a predetermined meeting participant, and the server determines whether or not the start meeting exists, based on the management table.

9. The information processing system according to claim 8, wherein the predetermined information further includes identification information of the predetermined meeting participant and time information indicating a time when the predetermined information is transmitted, the management table further includes start meeting information related to the start meeting, and when the predetermined information is compatible with the start meeting information, the server transmits the connection instruction to the sharing device.

10. The information processing system according to claim 1, wherein the sharing device is capable of controlling an output device that outputs information, and when the sharing device receives the connection instruction, the sharing device causes the output device to output information received from the information terminal.

11. The information processing system according to claim 10, wherein the output device is a display device that displays an image, and when the sharing device receives the connection instruction, the sharing device causes the display device to display an image being displayed on the information terminal.

12. An information terminal capable of communicating with a server, comprising:

a processor; and a memory storing program instructions, when executed, the program instructions cause the processor to perform:

wherein the server stores a management table for managing a meeting, the management table includes information in which location information indicating a location where a meeting is held and identification information of a sharing device installed at the location where the meeting is held are associated, in a case where a start meeting exists, when the information terminal detects a sharing device being communicably connected to the server, the start meeting indicates a meeting scheduled to start within a predetermined time period from a current time, transmitting predetermined information including the identification information of the detected sharing device to the server;

when a connection instruction to communicate with the information terminal is transmitted from the server to the sharing device based on the predetermined information and the management table to cause the sharing device to execute a connection process with the information terminal, communicably connecting to the sharing device wirelessly.

13. A display apparatus comprising:

a display device that displays an image; and a sharing device that is communicably connected to an information terminal and a server that stores a management table for managing a meeting, wherein the management table includes information in which location information indicating a location where a meeting is held and identification information of the sharing device installed at the location where the meeting is held are associated, in a case where a start meeting exists, when the information terminal detects the sharing device being communicably connected to the server, the information terminal transmits predetermined information including the identification information of the detected sharing device to the server, the start meeting indicates a meeting scheduled to start within a predetermined time period from a current time, the server transmits to the sharing device, based on the predetermined information and the management table, a connection instruction to communicate with the information terminal, the connection instruction being an instruction to cause the sharing device to execute a connection process, and when the sharing device receives the connection instruction, the sharing device executes the connection process to cause the sharing device and the information terminal to wirelessly connect to each other and to cause the display device to display an image being displayed on the information terminal.

\* \* \* \* \*